United States Patent [19]

Kataoka et al.

[11] Patent Number: 4,615,599

[45] Date of Patent: Oct. 7, 1986

[54] FLASH PHOTOGRAPHING SYSTEM

[75] Inventors: Hiroyuki Kataoka, Saitama; Masanori Yamada; Nobuyuki Suzuki, both of Kanagawa, all of Japan

[73] Assignee: Canon Kabushiki Kaisha, Tokyo, Japan

[21] Appl. No.: 723,331

[22] Filed: Apr. 15, 1985

Related U.S. Application Data

[62] Division of Ser. No. 636,851, Aug. 1, 1984, abandoned, which is a division of Ser. No. 444,214, Nov. 24, 1982, Pat. No. 4,501,481.

[30] Foreign Application Priority Data

Dec. 4, 1981 [JP] Japan .............................. 56-196031
Dec. 21, 1981 [JP] Japan .............................. 56-207685
Jan. 9, 1982 [JP] Japan .............................. 57-1904

[51] Int. Cl.$^4$ ............................................. G03B 15/03
[52] U.S. Cl. ................................... 354/415; 354/149.1
[58] Field of Search ............... 354/415, 482, 483, 126, 354/132, 141, 145.1, 149.1, 295

[56] References Cited

U.S. PATENT DOCUMENTS

| | | | |
|---|---|---|---|
| 4,003,065 | 1/1977 | Chikashige | 354/132 |
| 4,251,854 | 2/1981 | Kataoka et al. | 354/149.1 |
| 4,465,353 | 8/1984 | Yoshiyama et al. | 354/415 |
| 4,485,336 | 11/1984 | Yoshiyama et al. | 354/132 |
| 4,501,481 | 2/1985 | Kataoka et al. | 354/415 |

*Primary Examiner*—Russell E. Adams
*Attorney, Agent, or Firm*—Toren, McGeady, Stanger, Goldberg & Kiel

[57] ABSTRACT

A flash device for a photographic camera is arranged either to inhibit a flashing action or to shift the control mode of the camera from flash photography to daylight photography in cases where an object to be photographed is located outside of the adequately operatable range of distance. A pre-flashing action is performed to detect a distance to the object when a main capacitor is charged to a given level before the capacitor is amply charged for flash photography. Then flash photographing is performed at an aperture value determined on the basis of the detected distance when the distance is within the adequately operatable distance range. In the case where the detected distance is outside of the adequately operatable distance range, the main capacitor is further charged for an increased flashing power. After that, a distance to the object is again detected by a second pre-flashing action before the flash photographing is carried out at an aperture value determined on the basis of the distance detected by the second pre-flashing action. The flash photographing arrangement thus permits seizing a shutter chance in flash photographing an object located at relatively short distance without waiting until the main capacitor is amply charged.

8 Claims, 17 Drawing Figures

FLASH PHOTOGRAPHING SYSTEM

This is a divisional application of Ser. No. 636,851, filed Aug. 1, 1984, now abandoned which is a divisional of application Ser. No. 444,214 filed Nov. 24, 1982 now U.S. Pat. No. 4,501,481.

BACKGROUND OF THE INVENTION

1. Field of the Invention

This invention relates to a flash photographing system and more particularly to a flash photographing system of the type arranged to determine a diaphragm aperture value corresponding to a distance to an object to be photographed by pre-flashing a light before a main flashing action is performed at the determined aperture value.

2. Description of the Prior Art

There have been known photographic flash devices of the type in which a pre-flashing action is performed to detect a distance to an object and to determine a diaphragm aperture value according to the detected distance before a flash photographing operation is carried out at the determined aperture value. In the flash devices of this type, the aperture value is determined according to the distance to the object and a flash photographing operation is carried out at the aperture value so that the flash photography can be always adequately carried out. However, in carrying out photographing with a flash device of this type, if the object is located farther than the distance that can be covered by the light emitting capacity of the flash device, it is hardly possible to effect an adequate exposure even if the aperture value is predetermined by the above stated pre-flashing action.

When the aperture value determined by pre-flashing is smaller than the full-open F-number of the lens in use, the diaphragm cannot be set at the aperture value determined by pre-flashing (a designated aperture value). Then, it is impossible to have a proper exposure also in such a case.

Further, in the case where the object to be photographed is located at a very short distance from the camera, a flash photographing operation results in an over exposure even if it is carried out at an aperture value determined in accordance with the distance determined by pre-flashing.

The flash device of the above stated type has been thus incapable of ensuring a proper exposure in cases where the object to be photographed is located beyond a range of distances detectable by pre-flashing and where the object is located at a very short distance. It is, therefore, desirable for the flash device of this type to be arranged to ensure a proper exposure even for an object located at a long distance. This can be made possible by arranging the flash device to perform the pre-flashing action for determining an aperture value after the main capacitor thereof has been amply charged to impart a sufficient flashing power to the flash device. This arrangement, however, necessitates to inhibit flash photography until the main capacitor has been sufficiently charged. Then, with the flash device arranged in this manner, the photographer tends to miss a shutter chance. Meanwhile, in the case of an object located at a relatively short distance, the main capacitor does not have to be amply charged for obtaining a proper exposure. In spite of this, the arrangement to inhibit the flash photography until the main capacitor is sufficiently charged for an object located at a longer distance deprives the photographer of a shutter chance for photographing an object located at a shorter distance.

SUMMARY OF THE INVENTION

It is an object of the present invention to provide a flash photographing system for a photographic camera which obviates the above stated shortcomings of the prior art either by inhibiting a flashing action or by shifting the control mode of the camera to a daylight photographing mode in the case where an object to be photographed is located beyond an adequately operatable limit of distance.

It is another object of the invention to provide a flash photographing system which obviates the above stated shortcomings of the prior art arrangement either by inhibiting a flashing action or by shifting the control mode of the camera from flash photography to daylight photography when an object to be photographed is located at an extremely short distance.

It is a further object of the invention to provide a flash photographing system for a camera arranged either to inhibit a flashing action or to shift the control mode of the camera from a flash photography mode to a daylight photography mode in cases where an aperture value determined in accordance with a distance to an object to be photographed is smaller than the full-open F-number of the lens of the camera.

It is a still further object of the invention to provide a flash photographing system for a camera wherein a distance to an object is detected by pre-flashing etc. when a main capacitor is charged to a given level before the capacitor is fully charged; then when the distance is within an adequately operatable distance range flash photographing is performed at a diaphragm aperture value which is determined on the basis of the detected distance; or the main capacitor is further charged for an increased flashing power in the case where the distance detected is outside of the adequately operatable distance range; then, in the latter case, a distance to the object is again detected by a second pre-flashing action and flash photographing is carried out at an aperture value determined on the basis of the distance detected by the second pre-flashing action, so that a flash photographing operation can be carried out at a desired shutter chance for an object located at a relatively short distance in a short period of charging time without waiting until the main capacitor is fully charged for objects located at longer distances.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
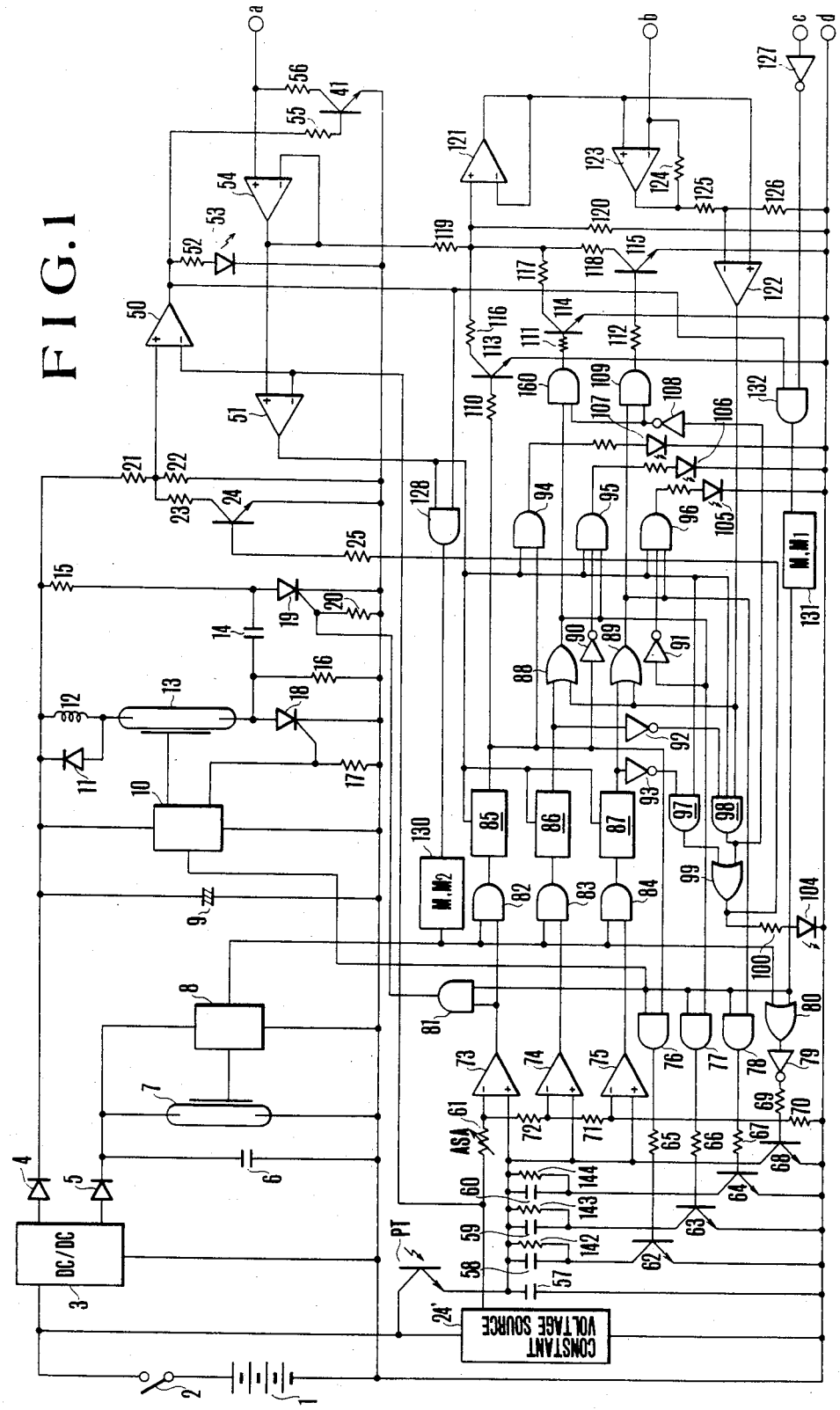
FIG. 1 is a circuit diagram showing a flash device as an embodiment of the present invention.

An embodiment of the flash photographing system according to the present invention comprises a flash device as shown in a circuit diagram in FIG. 1. Referring to FIG. 1, the flash device includes a battery 1; a power source switch 2 which is connected in series with the battery 1; a DC-to-DC converter 3 which is arranged in a known manner to boost the low voltage of the battery 1; diodes 4 and 5 arranged to rectify the output of the DC-to-DC converter 3; an auxiliary capacitor 6 provided for the purpose of causing a distance measuring auxiliary discharge tube 7 to emit a light; and a trigger circuit 8 which is arranged in a known manner to trigger the auxiliary discharge tube 7. The capacitor 6, the discharge tube 7 and the trigger circuit 8 constitute a distance measurement light emitting circuit. In the flash device, there are further included a main capacitor 9 which is arranged to cause a flash photographing main discharge tube 13 to emit a flash light; a trigger circuit 10 arranged in a known manner to trigger the main discharge tube 13 and a main thyristor 18; a diode 11 connected in parallel to an inductor 12 which is series connected to the main discharge tube 13; resistors 15 and 16 provided for the purpose of charging a commutation capacitor 14; a resistor 17 connected between the gate and the cathode of the main thyristor 18; and a resistor 20 connected between the gate and the cathode of an auxiliary thyristor 19. These circuit elements jointly constitute a control circuit which controls emission of flash light and termination of the flashing action. A comparator 50 which detects a voltage obtained through bleeder resistors 21 and 22 for the purpose of detecting the voltage of the main capacitor 9. The comparator 50 is arranged to produce a charge completion signal when the charge level of the main capacitor 9 reaches a predetermined potential. A transistor 24 has the base thereof connected through a resistor 25 to the output terminal of an OR gate 99 and the collector thereof connected through a resistor 23 to a connection point between the resistors 21 and 22. The transistor 24 is arranged to form a charge completion level setting circuit by connecting the resistor 23 in parallel to the resistor 22 for increasing the level of charge completion detection by the comparator 50. The charge completion detection level set by the resistors 21 and 22 corresponds to a charge level I of the main capacitor 9 necessary for obtaining a quantity of flash light required for obtaining a proper exposure for an object located at a relatively short distance d0-d3. Meanwhile, in the case where the object to be photographed is located at a distance farther than the distance d3, the charge completion detection level which is obtained with the resistor 23 connected in parallel with the resistor 22 is arranged to be at a value corresponding to a charge level II of the main capacitor 9 which is necessary in obtaining a flash light quantity required for obtaining a proper exposure for the object located at such a long distance. The output of the comparator 50 which is obtained as the charge completion signal when the main capacitor 9 is charged to a level I ensures a proper exposure for an object located within a distance range from d0 to d3. The charge completion signal of the comparator 50 which is obtained when the main capacitor 9 is charged to another level II ensures a proper exposure for an object located at a distance exceeding the distance d3. The flash device further includes a terminal a which is arranged to receive a constant voltage $V_{CT}$ supplied from the camera side in response to the first stroke of a release operation on the camera; a buffer amplifier 54 (hereinafter will be called the buffer 54) which produces a voltage received from the terminal a as it is; and a comparator 51 which detects the presence or absence of an output voltage of the buffer 54 and is arranged to produce a high level (hereinafter will be called HL for short) output as a first stroke signal in response to the output voltage of the buffer 54. The comparator 51 and the buffer 54 thus form a first stroke signal forming circuit. A resistor 52 is series connected to a light emitting diode 53, which is arranged to form a charge completion display circuit for indicating completion of a charging process by emitting a light according to the output of the comparator 50. A resistor 56 is connected to the above stated terminal a and the collector of a transistor 41. Another resistor 55 is connected to the output terminal of the comparator 50 and the base of the transistor 41. This transistor 41 forms a mode changeover signal forming circuit which, in response to the charge completion signal from the comparator 50, supplies a mode change-over current to the terminal a by impressing on the resistor 56 the above stated constant voltage impressed on the terminal a. There is provided a photo-transistor PT which is arranged to serve as light sensitive element for distance measurement and light adjustment. For example, the transistor PT is disposed in front of the casing of the flash device to receive a reflection light resulting from flashing. A reference numeral 24' indicates a known constant voltage circuit. The constant voltage circuit 24' is arranged to produce a reference voltage which is supplied to the comparators 50 and 51. The output of the constant voltage circuit 24' is further arranged to give a reference voltage to comparators 73, 74 and 75 after bleeding through a film sensitivity input volume control 61 and resistors 72, 71 and 70. Integration capacitors 57, 58, 59 and 60 are arranged to integrate the photo-current of the phototransistor 23. The capacitors 58, 59 and 60 respectively have high resistors 142, 143 and 144 for discharge connected thereto. An integration circuit for distance measurement and light adjustment is formed by the phototransistor and the capacitors. The voltage of the integration capacitor 57 is arranged to be AD converted through a comparators 73, 74 and 75. The output terminals of the comparators 73, 74 and 75 are respectively connected to AND gates 82, 83 and 84. One of the input terminals of each of the AND gates is connected to the output terminal of a monostable multivibrator (hereinafter will be called the one-shot) 130, the input terminal of the trigger circuit 8 or the input terminal of an OR gate 80. The one-shot 130 forms a distance measurement signal forming circuit, which produces a distance measurement action signal. This signal actuates the trigger circuit 8 to trigger the distance measuring auxiliary discharge tube; turns on the AND gates 82, 83 and 84; and transmits the output states of the comparators 73, 74 and 75 respectively to storage circuits 85, 86 and 87 (hereinafter will be called latch circuits). The above stated comparator 51 is arranged to serve as a latch signal forming circuit which produces a latch signal for controlling the actions of the latch circuits. The latch circuits 85, 86 and 87 are arranged to produce an HL signal in response to an HL signal supplied thereto within a period of time during which an HL output is produced from the comparator 51 and are arranged to maintain the HL signal until the output of the comparator 51 becomes a low level (hereinafter will be called LL). The flash device is further provided with AND gates 76, 77 and 78. The output terminals of these AND gates 76, 77 and 78 are connected to the bases of transistors 62, 63 and 64 through resistors 65, 66 and 67. The collectors of the transistors 62, 63 and 64 are respectively connected to the above stated capacitors 58, 59 and 60. The transistors and the AND gates jointly form an integration capacitor selection circuit for selection of the above stated capacitors. A terminal c is a synchronization terminal to be connected to the synchronizing switch of the camera. An AND gate 132 has one of the input terminals thereof connected to an inverter 127 and the other input terminal to the output terminal of the above stated comparator 50. The output terminal of the AND gate 132 is connected to the input terminal of a one-shot circuit 131. The one-shot circuit 131 is arranged to produce a one-shot pulse as a flash start signal in response to the output of the AND gate 132 and has the output terminal thereof connected to the above stated AND gates 76, 77 and 78. The one-shot circuit 131, the AND gate 132 and the inverter 127 form a flash start signal forming circuit for actuating the above stated selection circuit as well as for causing a flashing action to take place. A reference numeral 80 indicates an OR gate; 79 indicates an inverter; and 69 indicates a resistor. Through this resistor 69, a transistor 68 has its base connected to the inverter 79. Meanwhile, a part of the transistor 68 between the emitter and collector thereof is connected in parallel to the above stated integration capacitors 57, 58, 59 and 60. The transistor 68, the inverter 79 and the OR gate 80 form an actuation control circuit which is arranged to actuate the above stated integration circuit only at the time of a flashing action. AND gates 94, 95 and 96 respectively have light emitting diodes 105, 106 and 107 connected to their output terminals. The AND gates 94, 95 and 96 and the light emitting diodes 105, 106 and 107 form a display circuit which is arranged to indicate a designated aperture value for flash photography and/or a distance to an object to be photographed. In this display circuit, the light emitting diode 107 is arranged to indicate that the distance to the object is a short distance and the designated aperture value represents a small aperture $F_0$. The light emitting diode 106 is arranged to indicate that the distance to the object is a medium distance and that the designated aperture value represents an aperture $F_1$ which is closer than the aperture $F_0$ to a maximum or fullopen aperture. The light emitting diode 105 is arranged to indicate that the object distance is a long distance and that the designated aperture value represents an aperture $F_2$ which is closer than the aperture $F_1$ to the maximum aperture. A buffer amplifier 121 has a non-inversion input terminal thereof connected to the connection point of bleeder resistors 119 and 120 which are arranged for the output of the buffer 54 mentioned in the foregoing. The buffer amplifier 121 (hereinafter will be called the buffer 121) is arranged to have the input voltage of the non-inversion input terminal thereof produced as it is through the output terminal thereof. An operational amplifier 123 has the non-inversion input terminal connected to the output terminal of the above stated buffer 121 and has a resistor 124 connected between the output terminal and the inversion input terminal thereof. The voltage of the non-inversion input terminal is arranged to be produced as it is to the inversion input terminal of the amplifier. Aperture information resistors 116, 117 and 118 are connected to the non-inversion input terminal of the buffer 121. Meanwhile, transistors 113, 114 and 115 have these resistors 116, 117 and 118 respectively connected to the collectors thereof. The buffer 121, the operational amplifier 123, the resistors 119, 120, 116, 117 and 118 and the transistors 113, 114 and 115 constitute an aperture information forming circuit which is arranged to produce an aperture information voltage for flash photography to be transmitted through a terminal b to the aperture control circuit of the camera. The resistance values of the resistors 116, 117 and 118 of this circuit are arranged to be set in the following manner: The potential of the non-inversion input terminal of the buffer 121, i.e. the aperture information voltage to be supplied to the terminal b becomes a voltage $V_0$ representing the aperture value $F_0$ when all of these resistors 116, 117 and 118 are connected in parallel relative to the resistor 120; becomes a voltage $V_1$ representing the aperture value $F_1$ when the resistors 117 and 118 are connected in parallel relative to the resistor 120; and becomes a voltage $V_2$ representing the aperture value $F_2$ when only the resistor 118 is connected in parallel relative to the resistor 120. The resistance values of the resistors 119 and 120 are set in such a manner that the above stated aperture information voltage becomes a voltage $V_3$ representing an F-number $F_3$ which is smaller than a full-open aperture value of a lens normally in use (such as F1.0).

Numerals 160, 109 and 98 indicate AND gates; 90, 91, 92 and 93 indicate inverters; and 88 and 89 indicate OR gates. These logic elements form a control circuit which drives and controls the selection circuit for the integration circuit, the aperture display circuit and the aperture information forming circuit on the basis of the contents of the latch circuits 85, 86 and 87.

Bleeder resistors 125 and 126 are connected to the output terminal of the above stated amplifier 123. A comparator 122 has one of the input terminals thereof connected to the connection point of the bleeder resistors and the other input terminal thereof connected to the output terminal of the above stated buffer 121. The comparator 122, the bleeder resistors 125, 126 and the above stated amplifier 123 jointly form a detection circuit which detects information on the full-open F-number of the lens disposed on the camera side. The terminal b is connected to a full-open F-number information source disposed on the camera side and the above stated detection circuit is arranged to detect the full-open F-number of the lens by detecting the value of the impedance Z of the full-open F-number information source. The comparator 122 produces an LL output when the full-open F-number of the lens is of a smaller value than the above stated designated aperture value F$_2$, that is, when the lens is brighter than the aperture value F$_2$, and produces an HL output when the lens in use is darker than the designated aperture value F$_2$.

A numeral 104 indicates a light emitting diode which is arranged to give a warning when a distance to the object to be photographed is outside of an adequately operatable distance range; and a symbol d indicates a grounding terminal.

Figure 2:
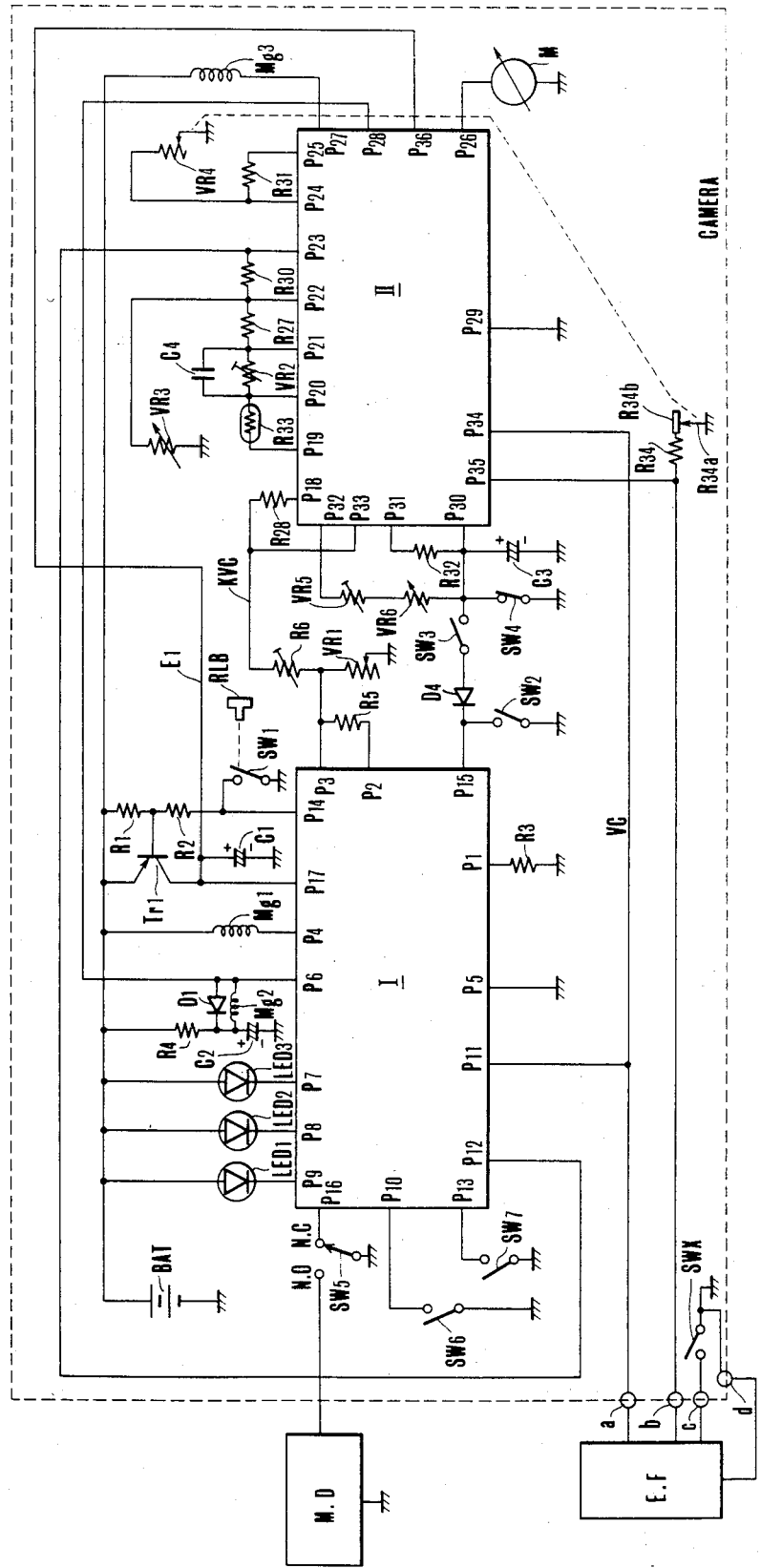
FIG. 2 is a circuit diagram showing a camera with the flash device of FIG. 1 mounted thereon.

In FIG. 2 which is an electric circuit diagram showing a camera to be used in combination with the flash device of FIG. 1. The parts to be contained within the camera body are encompassed with a broken line. In FIG. 2, a block MD represents a motor drive device and another block EF represents the flash device which has been described in the foregoing with reference to FIG. 1. The terminals a, b, c and d are identical with the terminals a, b, c and d shown in FIG. 1. A block I indicates an integrated circuit (LSI) which forms a sequence control part and an automatic exposure control part. The integrated circuit I is provided with input and output terminals and external discrete component connection terminals P1-P17. Another integrated circuit II (LSI) forms a light measuring part, a computing part and a shutter time control part. The integrated circuit II is provided with input and output terminals and external discrete component connection terminals P18-P36. The camera includes an information display meter M; electromagnets Mg1, Mg2 and Mg3; a transistor Tr1 which forms a power supply holding circuit for holding a power supply from a power source BAT; display light emitting diodes LED1-LED3; switches SW1-SW7; variable resistors VR1-VR7 provided for the purposes of setting information, etc.; and a power source battery BAT.

Further referring to FIG. 2, the camera is provided with a shutter release operation button RLB; a switch SW1 which turns on when the release button RLB is depressed to a first stroke position; a switch SW2 which turns on when the release operation button RLB is depressed to a second stroke position for a shutter release action; a switch SW3 which is arranged to turn on at the time of a bulb exposure; a count switch SW4 which is arranged to turn off when the shutter is opened; and a change-over switch SW6 for change-over between automatic photographing and manual photographing. The switch SW6 is arranged to turn on at the time of manual photographing. The camera further includes a switch SW7 which is for self-timer photographing and is arranged to turn on when a self-timer is used; a switch SW5 which is for switch-over between a film winding action and a photographing action of the camera when photographing is performed with the motor drive device MD used and is arranged to shift to one side N.C upon completion of the film winding action and to the other side N.O. upon completion of the travel of a trailing shutter curtain; a switch SWX which is arranged to trigger the flash device for flashing by turning on upon completion of the travel of a leading shutter curtain; a magnet Mg1 for automatic exposure control; a magnet Mg2 for starting a camera action; and another magnet Mg3 for shutter time control.

In the camera shown in FIG. 2, the circuit element II performs light measurement, computation and shutter time control in an analogical manner. The circuit element I digitally performs aperture control for automatic exposure and sequential control in various photographing mode. The details of these actions have already been known from U.S. Pat. No. 4,265,521. Therefore, these actions will be described hereinafter together with detailed description of the integrated circuit II which relates to the present invention.

Figure 3:
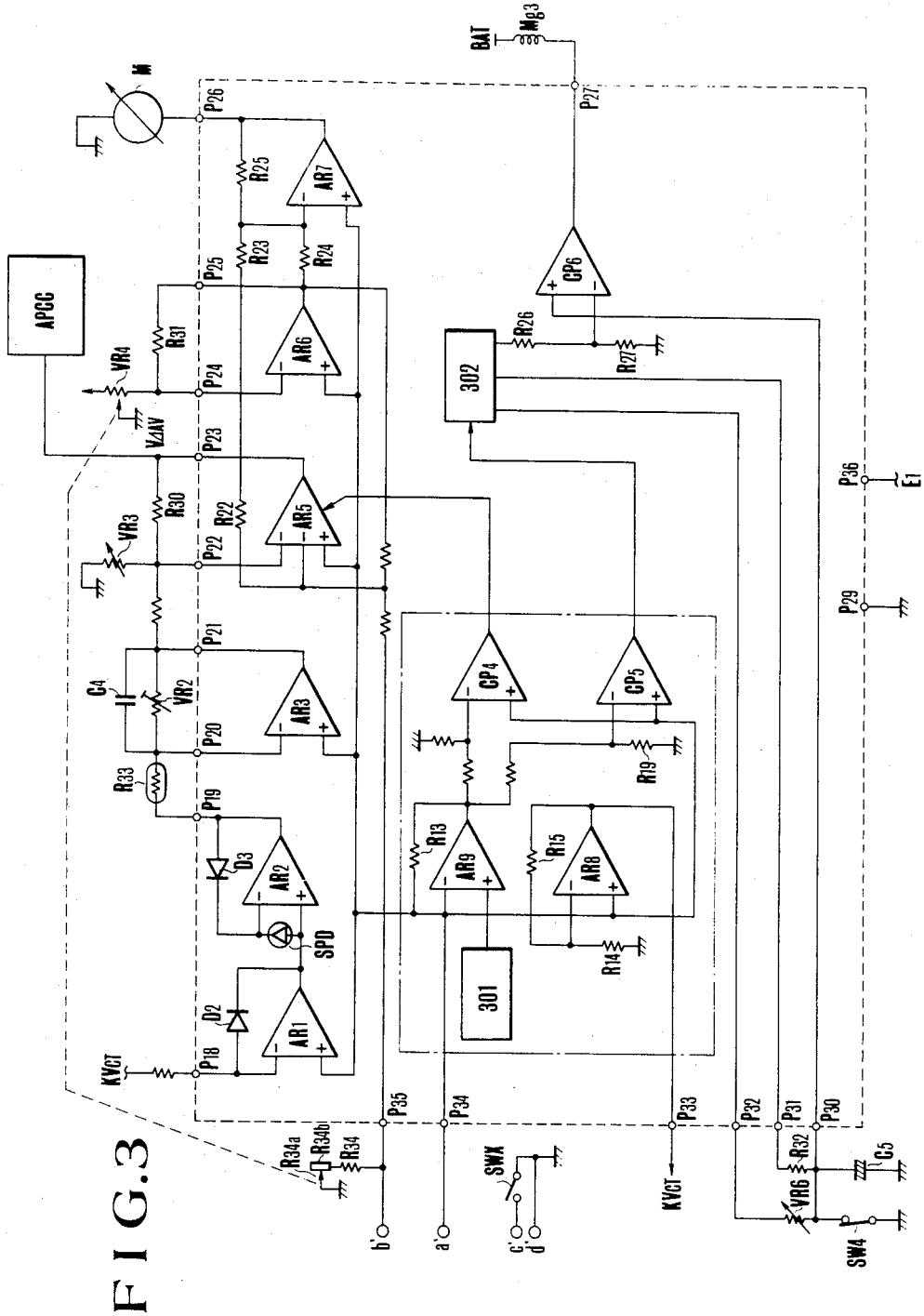
FIG. 3 is a circuit diagram showing the details of arrangement of a circuit II of the camera shown in FIG. 2.

FIG. 3 shows the details of the electric circuit II of the camera of FIG. 2 as an embodiment example. Referring to FIG. 3, the circuit is provided with connection terminals a', b', c' an d' which are arranged to be connected to the terminals a, b, c and d of the flash device shown in FIG. 1 respectively. A constant voltage source 301 is arranged to produce a constant voltage V$_{CT}$ which has been mentioned in the foregoing. The output terminal of this constant voltage source 301 is connected to the non-inversion input terminal of an operational amplifier AR9. The operational amplifier has a feedback resistor R13 connected between the inversion input terminal and the output terminal thereof. The inversion input terminal of the amplifier is connected to the terminal a'. The potential of the non-inversion input terminal and that of the inversion terminal of the operational amplifier AR9 are equal. Such being the arrangement, the above stated constant voltage V$_{CT}$ is produced at the terminal a'. There are provided comparators CP4 and CP5 each of which has its negative input terminal connected to the output terminal of the amplifier AR9 through a resistor and its positive input terminal connected to the inversion input terminal of the same amplifier. These comparators CP4 and CP5 form a photographing mode change-over circuit in conjunction with a shutter time change-over circuit 302. A variable resistor VR6 gives a resistance value corresponding to a preset shutter time in response to a shutter dial. A fixed resistor R32 serves as shutter time information source for flash photography. In conjunction with these resistors VR6 and R32, a capacitor C5 forms a time constant circuit. A count switch SW4 turns off in response to the travel of the leading shutter curtain. A comparator CP6 has its negative input terminal arranged to receive a reference voltage through resistors R26 and R27 and its positive input terminal connected to the output terminal of the above stated time constant circuit. There is provided a magnet Mg3 for holding the trailing shutter curtain. A shutter time control circuit is formed by these circuit elements. The above stated change-over circuit 302 is connected to the resistors VR6 and R32 which form the shutter time control circuit. The circuit 302 is thus arranged to connect the resistor R32 to the capacitor C5 in response to an LL output of the above stated comparator CP5 and to connect the variable resistor VR6 to the capacitor C5 in response to an HL output of the comparator CP5.

An operational amplifier AR8 has its non-inversion input terminal connected to the inversion input terminal of the above stated amplifier AR9; has its inversion input terminal connected to the ground through a resistor R14; and has a resistor R15 connected to its feedback path. The operational amplifier AR8 is thus arranged to increase the constant voltage V$_{CT}$ by K times.

A silicon photo-diode SPD is arranged for light measurement. An operational amplifier AR2 has the silicon photo-diode connected between its input terminals and also has a diode for logarithmic suppression connected to its feedback path. The operational amplifier AR2 is thus arranged to form a light measurement circuit. There is provided another operational amplifier AR1 which has a diode D2 connected between its input terminals and has its output terminal connected to the non-inversion input terminal of the other amplifier mentioned above. A posistor R33 is connected to the output terminal of the above stated light measurement circuit. The posistor and the amplifier AR1 form a temperature compensation circuit for the light measurement circuit. A variable resistor VR2 and a capacitor C4 are parallel connected between the inversion input terminal and the output terminal of an operational amplifier AR3. The amplifier AR3 is thus arranged to form a compensation circuit compensating for a flicker included in the light measurement output. There is provided a variable resistor VR3 for setting a shutter time value and film sensitivity information. An operational amplifier AR5 which is provided with first and second inversion input terminals has the first inversion input terminal connected to the variable resistor VR3 and the amplifier AR3 while the second inversion input terminal is connected to the terminal b' mentioned in the foregoing. This amplifier AR5 is thus arranged to form an operational circuit to compute (for daylight photography) the information supplied to the first input terminal in response to an HL output of the comparator CP4 and to compute (for flash photography) the information supplied to the second input terminal in response to an LL output of the comparator. A variable resistor VR4 is arranged for setting information on the full-open F-number of a lens which is mounted on the camera. The variable resistor VR4 is connected to an operational amplifier AR6, which has a resistor R31 connected to its feedback path. The amplifier AR6 is thus arranged to form a full-open aperture signal forming circuit which produces a voltage corresponding to a full-open aperture value. The outputs of the amplifiers AR5 and AR6 are computed at another operational amplifier AR7. There are provided a display meter M; a resistor R34 which has an impedance Z and is provided with a fixed contact R34b and a movable contact R34a, which moves in response to the above stated variable resistor VR4. When the full-open aperture value set at the resistor VR4 is smaller than the value $F_2$ mentioned in the foregoing, the movable contact R34a comes into contact with the fixed contact R34b. When the setting value is larger than the value $F_2$, the movable contact R34a disengages from the contact R34b. A full-open aperture information source is arranged in this manner and the information on the full-open F-number is transmitted to the terminal b' in the form of an impedance value. A reference symbol SWX indicates a synchronization switch; and APCC indicates an aperture control circuit which controls the diaphragm aperture on the basis of the output of the amplifier AR5. When the aperture information supplied to the circuit APCC is of a value smaller than the full-open F-number, the diaphragm aperture is adjusted to the full-open F-number. Further, since details of the aperture control circuit are disclosed in the specification for the above stated U.S. Pat. No. 4,265,521, further description of it is omitted herein. Further, the portion of the camera encompassed with the broken line in FIG. 3 is composed of integrated circuits. These circuits are arranged to be rendered operative with power supply effected thereto in response to the first stroke of an operation on the release operation button of the camera.

The flash device of FIG. 1 according to the present invention operates in the following manner: First, the operation in the case where the full-open F-number of the lens in use is of a value smaller than the above stated aperture value $F_2$ is as described below:

When the power source switch 2 is turned on, the DC-to-DC converter 3 operates to boost the power source voltage 1. The boosted voltage output is transmitted to the main capacitor 6 of the distance measuring light emitting circuit through the rectifying diode 5 to charge the capacitor therewith. Meanwhile, the boosted voltage output is also impressed on the main capacitor 9 of the flashing circuit through the rectifying diode 4 to charge it with the voltage.

Before the first stroke of operation on the release button of the camera, the constant voltage is not impressed on the terminal a from the camera side and the output of the buffer 54 is at a low level. Accordingly, the level of the output of the comparator 51 is low. Under the condition before the first stroke of the release operation, therefore, the transistor 24 is off. The charge potential of the main capacitor 9 is therefore detected through the resistors 21 and 22. Then, when the main capacitor 9 is charged to the relatively low charge level I, the comparator 50 produces an HL output as a charge completion signal therefrom.

In response to the HL output of the comparator 50, the light emitting diode 53 lights up to indicate completion of the charging process. After this display of charge completion, each of the circuits shown in FIG. 3 is rendered operative when the first stroke of the release operation is performed. The constant voltage $V_{CT}$ from the constant voltage source 301 is then transmitted to the terminal a via the terminal a'. As a result of this, the output of the buffer 54 becomes the constant voltage potential to be impressed on the terminal a. Since the constant voltage $V_{CT}$ from the camera side is set at a higher potential than the reference voltage from the constant voltage source 24', the comparator 51 produces an HL output in response to the output of the buffer 54. Then, the AND gate 128 comes to have high level inputs impressed on both input terminals thereof. This causes the AND gate 128 to produce an HL output to trigger the one-shot circuit 130 to have a one-shot pulse issued therefrom. In response to this one-shot pulse, the trigger circuit 8 triggers the discharge tube 7 to cause the latter to emit a flash light (hereinafter, this flashing action by the discharge tube 7 will be called pre-flashing). Further, since the flashing level (or the quantity of flash light) must be kept constant and unvarying because the flash light from the discharge tube 7 is to be used for distance measurement, the charge potential of the capacitor 6 is arranged to be unvarying.

With the pre-flashing action performed in this manner, a reflection light thus obtained from the object to be photographed is received by the photo-transistor PT. Assuming that the quantity of the flash light emitted is unvarying and that the reflaction factor of the object is also unvarying, the photo-current of the photo-transistor PT becomes a charging current of a value inversely proportional to the square of the distance to the object. The capacitor 57 is charged with this photo-current. In other words, the one-shot pulse is transmitted to the inverter 79 through the OR gate 80. The pulse is inverted at the inverter 79 and is impressed on the transistor 68. This causes the transistor 68 to be off for a length of time corresponding to the width of the one-shot pulse to release the integration circuit from a short-circuited state. Therefore, the capacitor 57 is charged with the charging current from the photo-transistor PT only during the length of time corresponding to the width of the one-shot pulse. Under this condition, the transistors 62, 63 and 64 are off. Therefore, the above stated photocurrent is used solely for charging the capacitor 57.

With the capacitor 57 charged for a given length of time determined by the width of the one-shot pulse, the charge potential of the capacitor 57 becomes a voltage which is inversely proportional to the square of the distance to the object. This voltage is then converted into a digital value through an A-D converter consisting of the comparators 73, 74 and 75.

Assuming that the object is located at a distance within a short distance range d0–d1 (such as 1 m–2 m), the charge potential of the capacitor 57 during the above stated pulse width time is at a higher level than the voltage impressed on the negative input terminal of the comparator 73. This causes all the comparators 73, 74 and 75 to produce HL outputs. These HL outputs are then transmitted to the AND gates 82, 83 and 84. Since these AND gates 82, 83 and 84 have been opened in response to the above stated one-shot pulse beforehand, the output states of the comparators 73, 74 and 75 are transmitted to the latch circuits 85, 86 and 87. Since the latch circuits are arranged to produce HL outputs in response to an HL output of the comparator 51 while an HL output of the comparator 51 is impressed thereon, all the latch circuits 85, 86 and 87 produce HL outputs in response to the HL outputs of the comparators 73, 74 and 75 coming through the AND gates 82, 83 and 84 when the distance to the object to be photographed is within the short distance range d0–d1.

In the case where the object is located at a distance within a medium distance range d1–d2, for example from 2 m to 4 m, the charge voltage of the capacitor 57 becomes an intermediate potential between the potential of the negative input terminal of the comparator 74 and that of the negative input terminal of the comparator 73. The comparators 74 and 75 then produce HL outputs. This state is latched at the latch circuits in the same manner as in the case of the short distance range. Then, the latch circuits 86 and 87 produce HL outputs while the latch circuit 85 produces an LL output. In the case of a long object distance range d2–d3, such as a range from 4 m to 8 m, the charge voltage of the capacitor 57 becomes an intermediate potential between the negative input terminal potential of the comparator 74 and that of the comparator 75. This causes the comparator 75 to produce an HL output. In this case, therefore, it is only the latch circuit 87 that produces an HL output.

Further, when the distance to the object is farther than the above stated long distance range, for example beyond 8 m, the charge voltage of the capacitor 57 becomes lower than the negative input terminal potential of the comparator 75. This causes all the comparators 73, 74 and 75 to produce LL outputs. Therefore, the outputs of the latch circuits are kept at a low level.

As mentioned in the foregoing, the charge voltage of the capacitor 57 is A-D converted and a signal corresponding to the distance to an object to be photographed is latched at the latch circuits. Then, after the lapse of the length of time corresponding to the width of the one-shot pulse, the AND gates 82, 83 and 84 are closed to inhibit information supply to the latch circuits. After that, the latch circuits are kept in the same output state until the level of the output of the comparator 51 becomes low. Further, after the lapse of the one-shot pulse width time, the transistor 68 is turned on to reset the electric charge of the capacitor 57 and to inhibit the integrating action of the integration circuit. Since the distance measurement by the pre-flashing action does not require a large quantity of flash light and accordingly the discharge time is arranged to be less than 10 $\mu s$, the width of the one-shot pulse is arranged also to be about 10 $\mu s$.

The latch circuits 85, 86 and 87 are arranged to produce HL outputs when the object to be photographed is located at a distance within a short distance range d0–d1 as mentioned in the foregoing. In that case, therefore, the HL output of the latch circuit 85 is impressed on one of the input terminals of the AND gate 94. Meanwhile, an HL output of the comparator 51 is impressed on the other input terminal of the AND gate 94. Therefore, the AND gate 94 produces an HL output to cause the light emitting diode 107 to light up to indicate that the object to be photographed is located within the short distance range d0–d1 and that the designated aperture value for flash photography is a small aperture $F_0$, such as F8 for example. At that instant, the AND gate 95 has the output of the latch circuit 85 impressed thereon after the HL output of the latch circuit 85 has been converted to an LL output through the inverter 90. Meanwhile, the HL output of the latch circuit 86 which has been converted to an LL output through the inverter 91 and the OR gate 88 is impressed on the AND gate 96. Accordingly, the light emitting diodes 106 and 105 are respectively kept extinct.

Further, the HL outputs of the latch circuits 85, 86 and 87 turn the transistors 113, 114 and 115 on to have the aperture information resistors 116, 117 and 118 parallel connected relative to the resistor 120. In other words, the HL outputs of the latch circuit 85 is impressed directly on the base of the transistor 113 to turn on the transistor 113. The HL output of the latch circuit 86 is impressed on one of the input terminals of the AND gate 166 through the OR gate 88. The HL output of the latch circuit 87 is impressed on one of the input terminals of the AND gate 109 through the OR gate 89. Meanwhile, the HL output of the latch circuit 86 is inverted to LL through the inverter 92 and then is impressed on the AND gate 98 to cause the AND gate to produce an LL output. This in turn causes the inverter 108 to produce an HL output. Therefore, each of the above stated AND gates 160 and 109 has an HL input impressed also on the other input terminal thereof. Accordingly, the AND gates 160 and 109 also produce HL outputs to turn on the transistors 114 and 115. In the case of the short object distance d0–d1, therefore, the transistors 113, 114 and 115 are turned on to have resistors 116, 117 and 115 parallel connected relative to the resistor 120.

With the resistors 116, 117 and 118 parallel connected relative to the resistor 120, the output voltage of the buffer 121 becomes $V_0$. The potential of the inversion input terminal of the amplifier 123 also becomes $V_0$ to have the voltage $v_0$ produced to the terminal b.

On the other hand, since the output of the comparator 50 is at a high level (HL) as mentioned in the foregoing, the transistor 41 turns on. This allows a current which is based on the constant voltage $V_{CT}$ supplied from the camera side to the terminal a in response to the first stroke of the release operation to flow in through the resistor 56. At the terminal a, therefore, there flows a current $i = V_{CT}/R56$ (where $V_{CT}$ represents the constant voltage supplied from the camera side to the terminal a and R56 the resistance value of the resistor 56. This value of current is detected by the detection circuit disposed on the camera side. Accordingly, the operation mode of the camera has been switched over from a daylight photography mode to a flash-light photography mode. More specifically stated, with the above stated current $i=V_{CT}/R56$ flowing to the terminal a through the terminal a' shown in FIG. 3, the output potential of the amplifier AR9 increases by a value of resistor R13 X i. This causes the comparators CP4 and CP5 to produce LL outputs respectively. As a result of this, the amplifier AR5 is shifted to an operation mode for flash photography. Meanwhile, the change-over circuit 302 connects the resistor R32 to the capacitor C5 to form a shutter time circuit for flash photography. With the operation of the amplifier AR5 shifted to an operating condition for flash photography, the above stated voltage $V_0$ and the full-open aperture information from the amplifier AR6 are computed to obtain one of stepwise aperture values according to the voltage $V_0$. Then, the information on the aperture value is supplied to the aperture control circuit APCC. Accordingly, the camera is shifted to the mode for flash photography. The shutter time circuit is prepared for flash photography while the aperture control circuit receives the above stated voltage $V_0$, which by then has become a value corresponding to the aperture value $F_0$ (for example, F8). The light emitting diode 107 then comes to indicate the aperture value and the distance to the object. After the shift of the camera to the flash photography mode, the diaphragm mechanism of the camera comes to operate when the release button is operated to the second stroke thereof. The aperture control circuit APCC adjusts the diaphragm aperture according to the voltage $V_0$ of the terminal b to the aperture value $F_0$ (such as F8) designated for flash photographing an object located at a short distance. The leading shutter curtain comes to travel to initiate an exposure. The count switch SW4 of the camera is turned off by the travel of the leading shutter curtain. Then, a count action for a flash photographing shutter time begins. The synchronization switch SWX comes to operate and an LL signal is supplied to the terminal c. This LL signal is inverted by the inverter 127 into an HL signal. The HL signal is impressed on one of the input terminals of the AND gate 132 which has the HL output of the above stated comparator 50 impressed on the other input terminal thereof. The AND gate produces an HL output to trigger the one-shot circuit 131. The one-shot circuit 131 then produces a one-shot pulse. The one-shot pulse is transmitted to the trigger circuit 10 to actuate it. This causes the thyristor 18 to turn on and also supplies a trigger pulse to the flash discharge tube 13. The discharge tube 13 flashes for flash photographing. Meanwhile, the one-shot pulse is transmitted to the transistor 68 through the OR gate 80 and the inverter 79 to cause the transistor 68 to turn off. With the transistor 68 turned off, the integration circuit begins to operate. The one-shot pulse is further transmitted to one of the input terminals of each of the AND gates 76, 77 and 78. On the other input terminal of the AND gate 76 is impressed the HL output of the latch circuit 85. The AND gate 77 has the HL output of the latch circuit 86 impressed on the other input terminal thereof through the OR gate 88. Meanwhile, the HL output of the latch circuit 87 is impressed on the other input terminal of the AND gate 78 through the OR gate 89. Accordingly, the outputs of all these AND gates 76, 77 and 78 become HL to cause the transistors 62, 63 and 64 to turn on. In the case of a short distance, therefore, all the capacitors 58, 59 and 60 are parallel connected relative to the capacitor 57. The capacity of each of these capacitors is set in such a way that the capacitor capacity of the integration circuit becomes a value corresponding to the above stated aperture value $F_0$ when these capacitors 57, 58, 59 and 60 are connected in parallel. Therefore, the light adjusting condition of the light adjustment circuit operating as integration circuit is set at a value according to the above stated designated aperture value.

In the process of carrying out an integrating action with the capacity of the integration circuit adjusted to a condition according to the designated aperture value, when the charging voltage for the capacitor resulting from a photocurrent of the photo-transistor PT which receives a light of the object resulting from the flash light reaches the negative terminal potential of the comparator 73, the comparator 73 produces an HL output. This HL output of the comparator 73 is transmitted to one of the input terminals of the AND gate 81. Since the pulse from the above stated one-shot circuit 131 is impressed on the other input terminal of the AND gate 81, the AND gate 81 produces an HL output in response to the HL output of the comparator 73. This turns the thyristor 19 on. The electric charge of the commutation capacitor 14 is discharged to turn off the thyristor 18 by reversely biasing it. This causes the flash discharge tube 13 to stop flashing and thus to bring the flashing action of the flash device to an end.

Figure 4A:
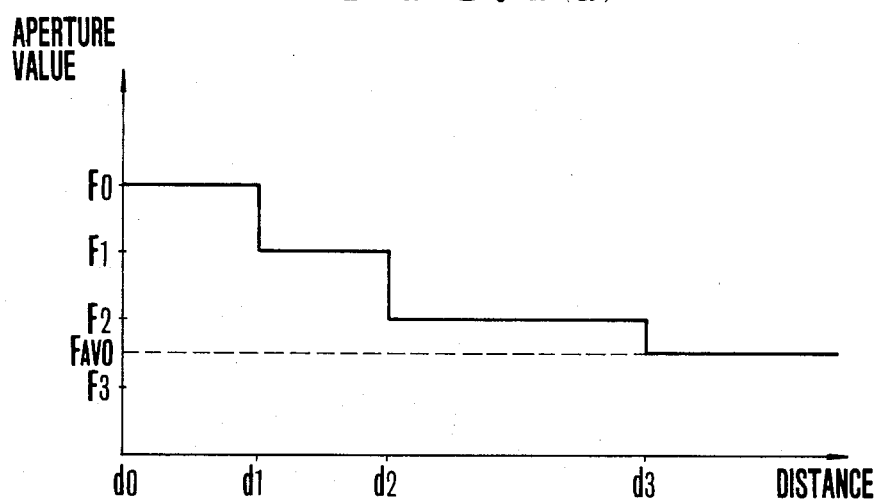
FIGS. 4(a) and (b) are illustrations showing the operation of the embodiment shown in FIG. 1.

As described above, in the case where the object is located at a short distance, the diaphragm aperture is set at $F_0$, that is, the aperture is set on the smaller aperture side as shown in FIG. 4(a). Then, the light adjusting condition is also adjusted to a value corresponding to the aperture value $F_0$. With the flashing action thus carried out, the shutter closes to end a flash photographing operation after the lapse of the shutter time for flash photography.

Next, the operation for an object located within a distance range d1-d3 is as follows: In this case, as has been described in the foregoing, the pre-flashing action for distance measurement has caused the latch circuits 86 and 87 to produce HL outputs and the latch circuit 85 to produce an LL output. Therefore, the AND gate 94 produces an LL output and the AND gate 95 an HL output while the AND gate 96 produces an LL output. This causes the light emitting diode 106, instead of the light emitting diode 107, to light up to indicate that the object is at a distance within a medium distance range d1-d2 and that the aperture value is $F_1$ (for exampel F4) which is closer to the full-open aperture than the above stated aperture value $F_0$.

Meanwhile, the LL output of the latch circuit 85 causes the transistor 113 to turn off. The transistors 114 and 115 on the other hand turn on in the same manner as in the case of the above described short distance. In this case of the medium distance, the resistors 117 and 118 are connected to the resistor 120 and a voltage $V_1$ which is of a higher potential than the above stated voltage $V_0$ is produced at the terminal b. Since this voltage $V_1$ corresponds to the aperture value $F_1$, information on the aperture value $F_1$ is transmitted to the aperture control circuit APCC of the camera in the same manner as has been described in the foregoing. When the release operation is performed to the second stroke thereof under that condition, the diaphragm aperture is adjusted to the aperture value $F_1$ according to the voltage $V_1$ from the terminal b in the same manner as has been described in the foregoing. Then, the flash discharge tube 13 flashes and the integration circuit performs an integrating action on the quantity of the flash light. The flashing action comes to an end when the terminal voltage of the capacitor of the integration circuit reaches a predetermined value, i.e. the negative terminal voltage of the comparator 73. Meanwhile, the shutter time is adjusted to the shutter time value for flash photography. Further, in the case of the medium distance, since the latch circuit 85 is producing an LL output, the AND gate 76 produces an LL output to have the transistor 62 off. The AND gates 77 and 78 on the other hand produce HL outputs in the same manner as in the case of the short distance to have the transistors 63 and 64 on. In this case, therefore, the capacitors 59 and 60 are parallel connected relative to the capacitor 57. Accordingly, the capacity of the integration circuit is smaller than in the case of the short distance. Therefore, the light adjustment condition is set at a condition corresponding to the aperture value $F_1$ during the light quantity integrating action performed by the integration circuit. The light emitting diode 106 then indicates that the aperture value is $F_1$ and the distance to the object is d1-d2. In the meantime, as shown in FIG. 4(a), the aperture is set at the aperture value $F_1$ which is closer to the full-open value than the aperture value $F_0$ used for the short distance. The light adjustment condition is also set at a value corresponding to the aperture value $F_1$.

The operation for an object located at a long distance d2-d3 is as follows: As a result of the pre-flashing action which is performed for distance measurement in the same manner as described in the foregoing, the latch circuits 85 and 86 produce LL outputs while the latch circuit 87 produces an HL output therefrom. Further, the full-open F-number of the photo-taking lens in use in this case is small. In other words, the camera is using a lens of large aperture, such as F1.0 or the like. Therefore, as will be further described later herein, the impedance of the full-open F-number information source is detected and the comparator 122 is producing an LL output.

Assuming that the resistance value of the resistor 125 is R1, that of the resistor 126 R2, impedance between the terminal b' shown in FIG. 3 and the ground Z, the voltage of the terminal b $V_{AV}$, the output of the amplifier 123 $V_{OUT}$ and the middle point potential between the resistors 125 and 126 VR, there obtains the following relation:

$$VR = V_{OUT}\frac{R2}{R1+R2} \quad V_{OUT} = V_{AV}\left(1 + \frac{R3}{Z}\right)$$

Since the condition for obtaining the HL output of the comparator 122 is $VR < V_{AV}$, there obtains the following relation:

$$V_{AV}\left(\frac{R2}{R1+R2}\right)\left(1 + \frac{R3}{Z}\right) < V_{AV}.$$

Then, from this is derived: $Z > R3R2/R1 = Z > C$ (constant value). In the case where the impedance of the resistor R34 is set at a value smaller than C and, because of this, a lens of full-open F-number larger than the value $F_2$ is mounted on the camera, the resistor R34 is opened as mentioned in the foregoing. Therefore, the comparator produces an HL output. If the full-open F-number of the lens mounted on the camera is smaller than the value $F_2$, the comparator 122 produces an LL output because the resistor R34 is connected between the terminals b and b' and the ground. With the LL output produced from the comparator 122, the output of the OR gate 88 also becomes LL. Accordingly the AND gate 95 produces an LL output. The AND gate 96 has its input terminals receiving an HL input which is obtained by inverting the LL output of the OR gate 88 through the inverter 91, another HL input coming from the latch circuit 87 through the OR gate 89 and a further HL input which comes from the comparator 51. Accordingly, the AND gate 96 produces an HL output. Therefore, where the object to be photographed is located at a long distance, only the light emitting diode 105 lights up to indicate that the object is at the long distance d2-d3 and that the aperture value is $F_2$ (for example, F2) which is closer to the full-open aperture than the above stated aperture value $F_1$.

Since the latch circuit 87 alone produces an HL output while the comparator 122 is producing an LL output as mentioned in the foregoing, the transistors 113 and 114 turn off while the transistor 115 alone turns on. More specifically stated, the transistor 113 is off because the latch circuit 85 is producing an LL output. The AND gate 160 produces an LL output because the OR gate 88 is producing the LL output as mentioned above. The LL output of the AND gate 160 causes the transistor 114 to turn off. Further, since the LL output of the comparator 122 is supplied to the AND gate 98, the AND gate 98 produces an LL output. The LL output of the AND gate 98 is inverted to an HL signal through the inverter 108 and is impressed on one of the input terminals of the AND gate 109. Since the HL output of the latch circuit 87 is impressed through the OR gate 89 on the other input terminal of the AND gate 109, the AND gate 109 produces an HL output, which causes the transistor 115 to turn on. In the case of a long object's distance, it is only the transistor 115 that turns on while the transistors 113 and 114 turn off. With the transistor 115 turned on alone, the registor 118 is solely connected to the resistor 120. As a result of this, a voltage $V_2$ (corresponding to the aperture value $F_2$) which is of a higher potential than the voltage $V_1$ is produced at the terminal b. Then, the voltage $V_2$ is transmitted to the aperture control circuit APCC of the camera.

Following that, when the release operation on the camera is effected to the second stroke thereof, the diaphragm aperture of the camera is adjusted to the aperture value $F_2$ according to the voltage $V_2$ from the terminal b. Meanwhile, the flash discharge tube 13 flashes and the integration circuit performs an integrating action on the quantity of the flash light. The flashing action comes to an end when the terminal potential of the capacitor of the integration circuit reaches the negative terminal potential of the comparator 73. The shutter time is adjusted to the shutter time value for flash photography. Since the latch circuit 85 is producing the LL output and the OR gate 88 is also producing the LL output in this case as mentioned above, the outputs of the AND gates 76 and 77 become LL while the AND gate 78 alone produces an HL output in the same manner as in the case of the short distance. Accordingly, the transistors 62 and 63 turn off. The transistor 64 alone turns on to have the capacitor 60 alone parallel connected to the capacitor 57. Therefore, the capacity of the integration circuit becomes smaller than the capacity obtained in the case of the medium distance and thus the light adjusting condition for the light quantity integrating action by the integration circuit is set to a condition corresponding to the aperture value $F_2$.

In the case of the long distance d2–d3, the diode 105 thus indicates that the aperture value is $F_2$ and the object's distance is d2–d3. Meanwhile, the diaphragm is set at the aperture value $F_2$ which is closer to the full-open aperture than the aperture value $F_1$ for the medium distance. The light adjusting condition is also set at a value corresponding to the aperture value $F_2$. A flash photographing operation is carried out under these conditions.

The operation of the embodiment when the object to be photographed is located at a distance farther than the distance d3 is as follows: The pre-flashing action is performed for distance measurement as mentioned in the foregoing. As a result of the pre-flashing action, all the latch circuits 85, 86 and 87 are producing LL outputs in this case. Therefore, the inverter 93 produces an HL output and this HL output is impressed on one of the input terminals of the AND gate 97. The AND gate 97 on the other hand has the HL output of the comparator 51 impressed on the other input terminal thereof. The AND gate 97 therefore produces an HL output in response to the HL input from the inverter 93. The HL output of the AND gate 97 comes through the OR gate 99 to cause the light emitting diode 104 to light up. The light emitting diode thus indicates that a proper exposure cannot be made at the charge level I mentioned in the foregoing. The HL output produced through the OR gate 99 is impressed on the base of the transistor 24 to turn it on. As a result of this, the resistor 23 is parallel connected to the resistor 22 to set the charge completion detection level at a high value. The above stated level I is thus shifted to another level II. The shift to the charge level II extinguishes a charge completion signal (an HL signal) which has been produced from the comparator 50. The comparator 50 then produces an LL output. The light emitting diode 53 is extinguished and the transistor 41 turns off. A mode change-over current which has been flowing to the terminal a disappears. The photographing mode of the camera is shifted to a mode for daylight photography to inhibit flash photography. After the shift to the level II, the main capacitor 9 is further charged and when the charge level of the main capacitor 9 reaches the level II, again the comparator 50 produces a charge completion signal (an HL signal). Therefore, if the release operation is kept at the first stroke thereof, the AND gate 128 produces an HL output in response to the HL output of the comparator 50. With the HL output produced from the AND gate 128, again the one-shot circuit 130 is triggered. Then, again this causes the distance measuring discharge tube to emit a flash light in the same manner as described in the foregoing. Distance measurement by pre-flashing is thus once again carried out. The contents of the latch circuits 85, 86 and 87 are determined according to the distance to the object to be photographed. The transistor 41 also again turns on and the mode of the camera is shifted back to the flash photography mode. Assuming that the distance to the object remains the same, that is, if the object stays at the distance beyond d3, all the latch circuits 85, 86 and 87 produce LL outputs. Accordingly, the transistor 113 turns off. The LL outputs of the latch circuits 86 and 87 are applied to one of the input terminals of the OR gates 88 and 89. Further, since the comparator 122 is producing an LL output as mentioned above, input signals to the other input terminals of the OR gates 88 and 89 are also at LL. The OR gates 88 and 89 then transmit the LL signals to the AND gates 160 and 109. This causes the AND gates 160 and 109 to produce LL outputs which turns the transistors 114 and 115 off. Accordingly, in this case, a voltage $V_3$ which is defined through the resistors 120 and 119 at a value corresponding to an aperture value $F_3$ which is smaller than the full-open F-number of an ordinary lens is produced at the terminal b. After the second flashing action for distance measurement, the discharge tube 13 emits a flash light in response to the second stroke of the release operation in the same manner as the processes subsequent to the second stroke described in the foregoing. Meanwhile, the diaphragm aperture of the camera is adjusted to the aperture value $F_3$ according to the voltage $V_3$. If, in this case, the full-open F-number of the lens in use is an aperture value $F_{AVO}$ which is larger than the value $F_3$, the aperture is adjusted to the full-open F-number. Further, since the OR gates 88 and 89 and the latch circuit 85 are producing the LL outputs respectively, the AND gates 76, 77 and 78 also produce LL outputs and the transistors 62, 63 and 64 are off. In the case where the object is located at a distance beyond the distance d3, therefore, the capacitor capacity of the integration circuit is determined solely by the capacitor 57. Since the capacitor 57 is arranged to be of capacity corresponding to the full-open F-number of lenses ordinarily used, the light adjusting condition is set at a value corresponding to an aperture value for flash photography.

Further, if the resistance value of the resistors 119 and 120 is set at a value either corresponding to or a slightly larger than the full-open F-number of lenses to be ordinarily used and if the capacity of the capacitor 57 is set at a value corresponding to the F-number, the aperture value for an object located at a distance exceeding d3 is always adjusted to a value either to the full-open F-number or a slightly larger than the full-open aperture value. Then, the light adjusting condition also can be set at a value corresponding to the F-number. Such arrangement ensures a proper exposure without fail.

In the flash device according to the invention as has been described above, the charge level of the main capacitor is set at a relatively low level I when the distance to the object is within a relatively short distance range not exceeding the distance d3. In that case, the preparation for flash photographing can be completed in a relatively short period of time. In cases where the object is located at a distance which is farther than the distance d3 and is beyond an adequately operatable range with the flash light quantity available from the charge level I of the main capacitor, the charge level is shifted to a higher charge level II to ensure accurate control over the flash light quantity. Besides, when the object to be photographed is located at a long distance, flash photographing can be accomplished with a shorter waiting time as compared with the conventional flash devices.

The above description covers an instance where the distance to the object is detected to be still farther than the distance d3 through distance measurement accomplished by a second pre-flashing action and then the LL signals are latched at the latch circuits 85, 86 and 87 respectively. However, when the distance to the object has become shorter than the distance d3 at the time of the second distance measurement, the output conditions of the latch circuits are of course determined according to the distance to the object detected by the second distance measurement and the aperture value is determined also according to the detected distance in the same manner as described in the foregoing.

Next, when photographing is to be carried out with a lens of larger full-open aperture value than the aperture value $F_2$, the embodiment operate as follows: For objects located at a short distance d0–d1 and a medium distance d1–d2, both the aperture and the quantity of flash light are controlled in exactly the same manner as in the case where the lens in use is of a full-open aperture value which is smaller than the aperture value $F_2$. However, if the distance to the object is farther than the distance d2, flash photographing is carried out with the aperture controlled according to the full-open F-number.

Figure 4B:
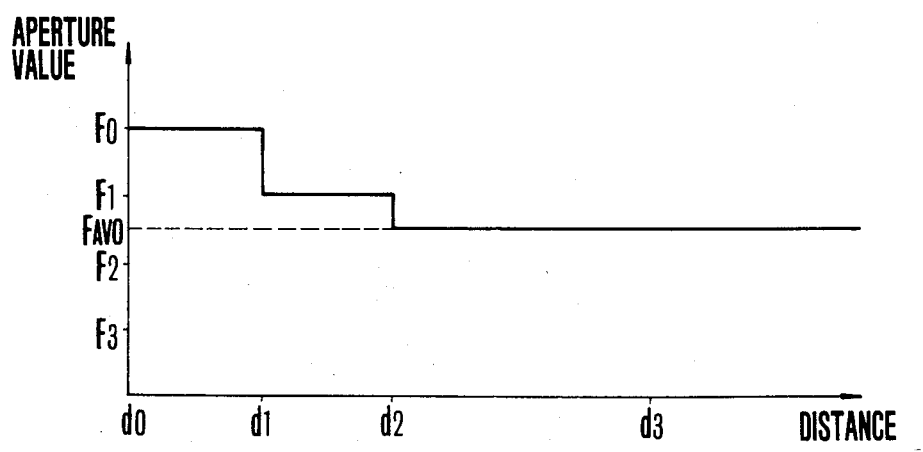

More specifically, in this case, the latch circuit 86 produces an LL output as a result of distance measurement by pre-flashing. Accordingly, the output is inverted through the inverter 92 and an HL signal thus obtained is impressed on the first input terminal of the AND gate 98. Meanwhile, the outputs of the comparators 122 and 51 are impressed on other input terminals of the AND gate 98. The comparator 51 is producing an HL output as mentioned in the foregoing. The comparator 122 is also producing and HL output because the full-open F-number of the lens in use is larger than the aperture value $F_2$. All the input signal to the AND gate 98 are therefore HL signals. Accordingly, the AND gate 98 produces an HL output. The HL output of the AND gate is transmitted to the transistor 24 through the OR gate 99 to cause the transistor to turn on. In this case, therefore, the charge level is shifted from the level I to the level II in the same manner as described in the foregoing. When the main capacitor 9 reaches the charge level II, the discharge tube 7 is again caused to flash for distance measurement. When the distance to the object is found to be exceeding the distance d2 through this distance measurement, the content of the latch circuit 86 is held at an LL. Accordingly, as mentioned in the foregoing, the AND gate 98 produces an HL output. This HL output is inverted to an LL signal at the inverter 108 and is transmitted to the AND gates 160 and 109. Therefore, in the case where the distance to the object is more than the distance d2, the AND gates 160 and 109 come to produce LL outputs, which causes the transistors 114 and 115 to turn off. Meanwhile, the transistor 113 is caused also to turn off by the LL output of the latch circuit 85. Therefore, in the same manner as in the above described case, the voltage V3 which corresponds to the aperture value $F_3$ is produced to the terminal b. Then, when the release operation is effected to the second stroke thereof, the discharge tube 13 flashes to accomplish flash photographing. Meanwhile, the aperture control circuit APCC of the camera adjusts the diaphragm aperture in accordance with the voltage V3. In this case, since the full-open aperture value of the lens is larger than the value $F_2$ as mentioned above, the diaphragm mechanism adjusts the aperture to the full-open value. Referring to FIG. 4(b), when the distance to the object is more than the distance d2, the diaphragm aperture is thus adjusted to the full-open F-number. At that instant, the LL output of the latch circuit 85 is transmitted to the AND gate 76. Further, the AND gates 77 and 78 have the HL output of the comparator 122 transmitted thereto through the OR gates 88 and 89. The transistor 62 is off. The transistors 63 and 64 are on. The capacitors 59 and 60 are connected to the capacitor 57. Therefore, when the distance to the object is more than the distance d2, the capacity of the integration circuit, i.e. the light adjusting condition is adjusted to a value corresponding to the aperture value $F_1$. Again referring to FIG. 4(b), although the aperture value $F_1$ and the value $F_{AVO}$ are not of the same value, the light adjusting condition is adjusted to a value approximately corresponding to the value $F_{AVO}$ because the value $F_{AVO}$ is arranged to be between the above stated value $F_2$ and the value $F_1$.

Figure 5:
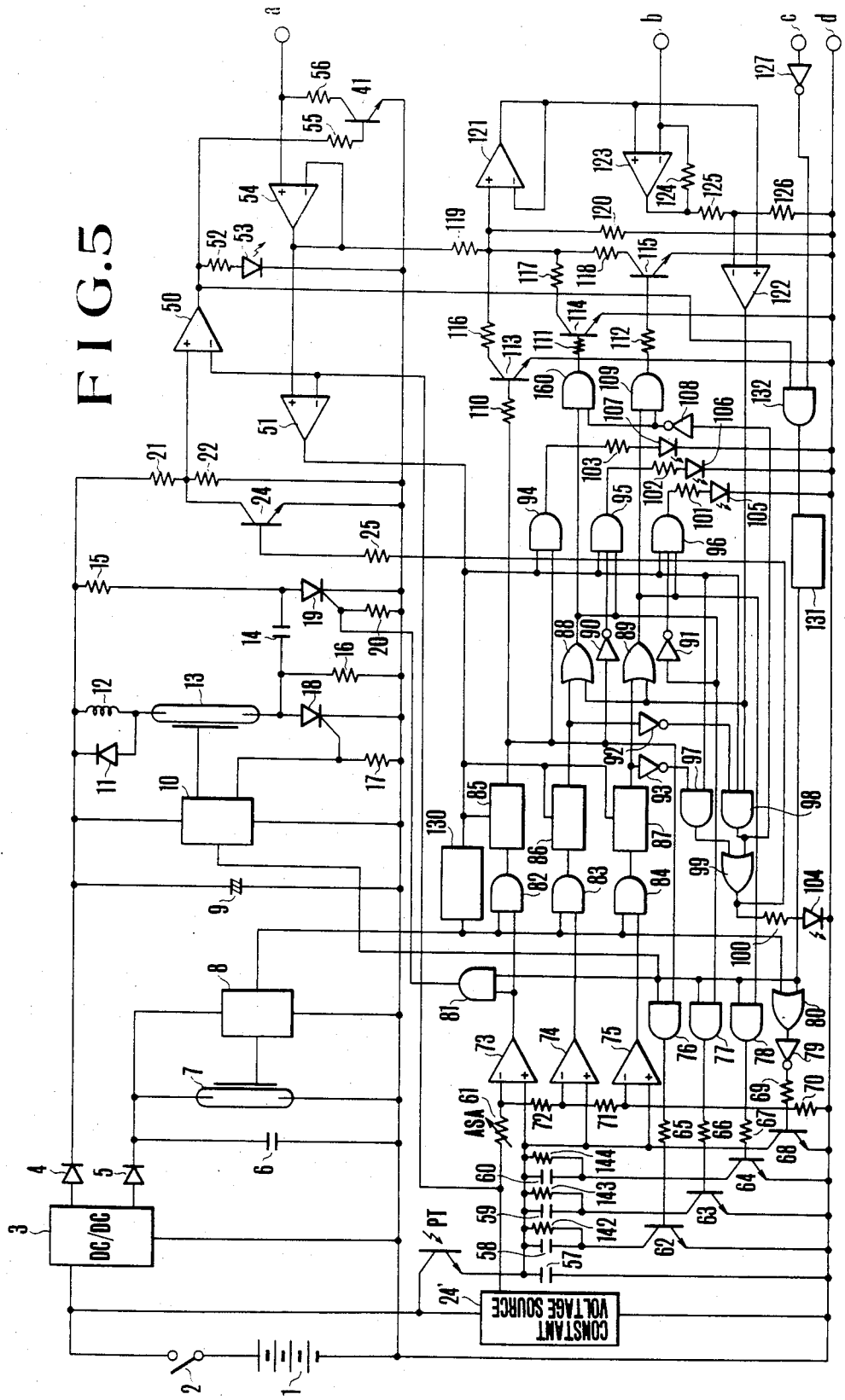
FIG. 5 is a circuit diagram a flash device as another embodiment of the invention.

FIG. 5 is a circuit diagram showing a flash device as another embodiment of the present invention. In FIG. 5, the parts of the embodiment identical with those of the first embodiment shown in FIG. 1 are indicated with the same reference numerals and symbols as those used in FIG. 1. This embodiment differs from the first embodiment shown in FIG. 1 in the following points: The one-shot circuit is arranged to be triggered directly by the output of the comparator 51. The resistor 23 which is series connected to the transistor 24 is removed and the transistor 24 is arranged such that, after it turns on, the flashing action of the flash device is inhibited and the photographing mode of the camera is shifted to the mode for daylight photography.

Figure 6A:
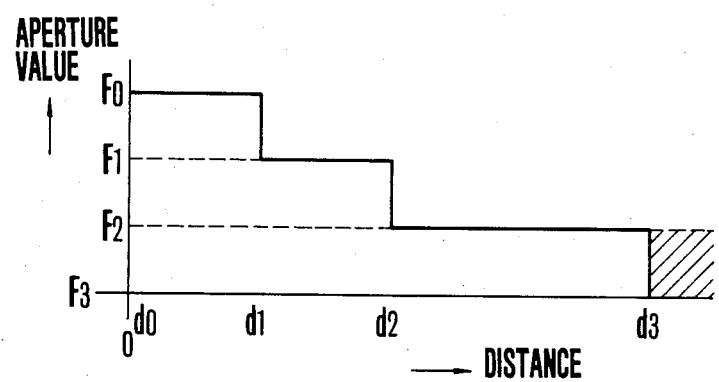
FIGS. 6(a) and (b) are illustrations showing the operation of the embodiment shown in FIG. 5

The operation of this embodiment shown in FIG. 5 is as follows: In cases where the full-open aperture of the lens in use is brighter than the aperture value $F_2$ and the object to be photographed is located at a distance within any of the distance ranges d0–d1, d1–d2 and d2–d3, the diaphragm aperture is controlled to one of the aperture valves $F_0$, $F_1$ and $F_2$ as shown in FIG. 6(a) and the light adjusting action is performed in exactly the same manner as in the first example shown in FIG. 1. Therefore, description of these cases is unnecessary and omitted herein.

When the distance to the object exceeds the distance d3, all the latch circuits 85–87 produces LL outputs in the same manner as described in the foregoing. As a result of that, the OR gate 99 produces an HL output. The light emitting diode 104 lights up to indicate that the object is located at a distance beyond the adequately operatable range. The transistor 24 turns on. The potential of the non-inversion input terminal of the comparator 50 drops to result in an LL output of the comparator 50. The transistor 41 turns off to cut off a current flowing to the flash device from the camera. Accordingly, the level of the output of the amplifier AR9 which is shown in FIG. 3 drops. Both the comparators CP4 and CP5 produce HL outputs. The operating mode of the amplifier AR5 is shifted from a mode for flash photography to a daylight photography mode. The light measurement output from the light measurement amplifier AR2 which is supplied to the first input terminal of the amplifier AR5 and the shutter time information which is set through the resistor VR3 are computed at the amplifier AR5 to obtain a computed aperture value corresponding to the brightness of the object to be photographed. The change-over circuit 302 is arranged to select the resistor VR6 and to connect it to the capacitor C5 in response to an HL signal from the comparator CP5. Therefore, when the release operation on the camera is effected to the second stroke thereof, the aperture control circuit APCC adjust the diaphragm to an aperture value for daylight photography while the shutter time is adjusted to a shutter time value preset at the resistor VR6. The exposure is thus controlled in the daylight photography mode. Further, since the comparator 50 is producing an LL output at this instant as mentioned above, the AND gate 132 is also producing an LL output. Therefore, even when the synchronization switch SWX turns on, the discharge tube 13 remains incapable of flashing. In this embodiment, therefore, a photographing operation is performed in the daylight photography mode when the object is located beyond the adequately operatable distance range.

Figure 6B:
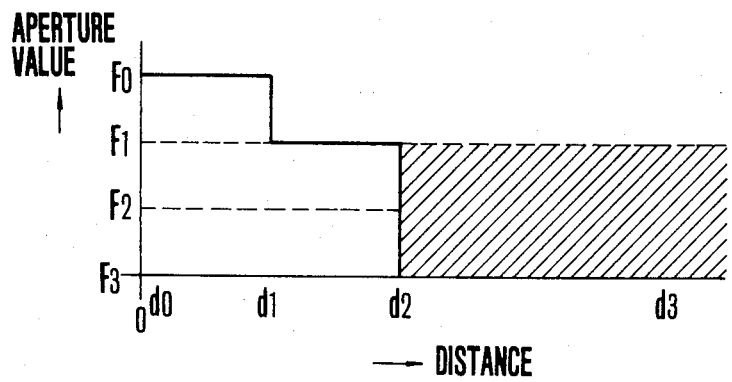

When the full-open F-number of the lens in use is darker than the aperture value $F_2$, the embodiment operates as follows: If the distance to the object to be photographed is within any of the distance ranges d0-d1 and d1-d2, the diaphragm aperture is controlled according to the aperture value $F_0$ or $F_1$ as shown in FIG. 6(b) and flash photographing is performed in the same manner as in the case of the first embodiment shown in FIG. 1. Therefore, description of such instances is omitted herein.

If the distance to the object is farther than the distance d2, the latch circuit 86 produces an LL output. Meanwhile, since the lens in use is darker than the aperture value $F_2$, the comparator 122 is producing an HL output. Accordingly, the AND gate 98 produces an HL output and the OR gate 99 also produces an HL output to turn the transistor 24 on. Therefore, in this instance, flash photographing is inhibited in the same manner as described in the foregoing. The diaphragm aperture is controlled in the daylight photography mode and the photographing operation is carried out in that mode. In this embodiment, as has been described above, photographing is performed in the daylight mode when the object to be photographed is located beyond the adequately operatable distance range of the flash device.

Figure 7:
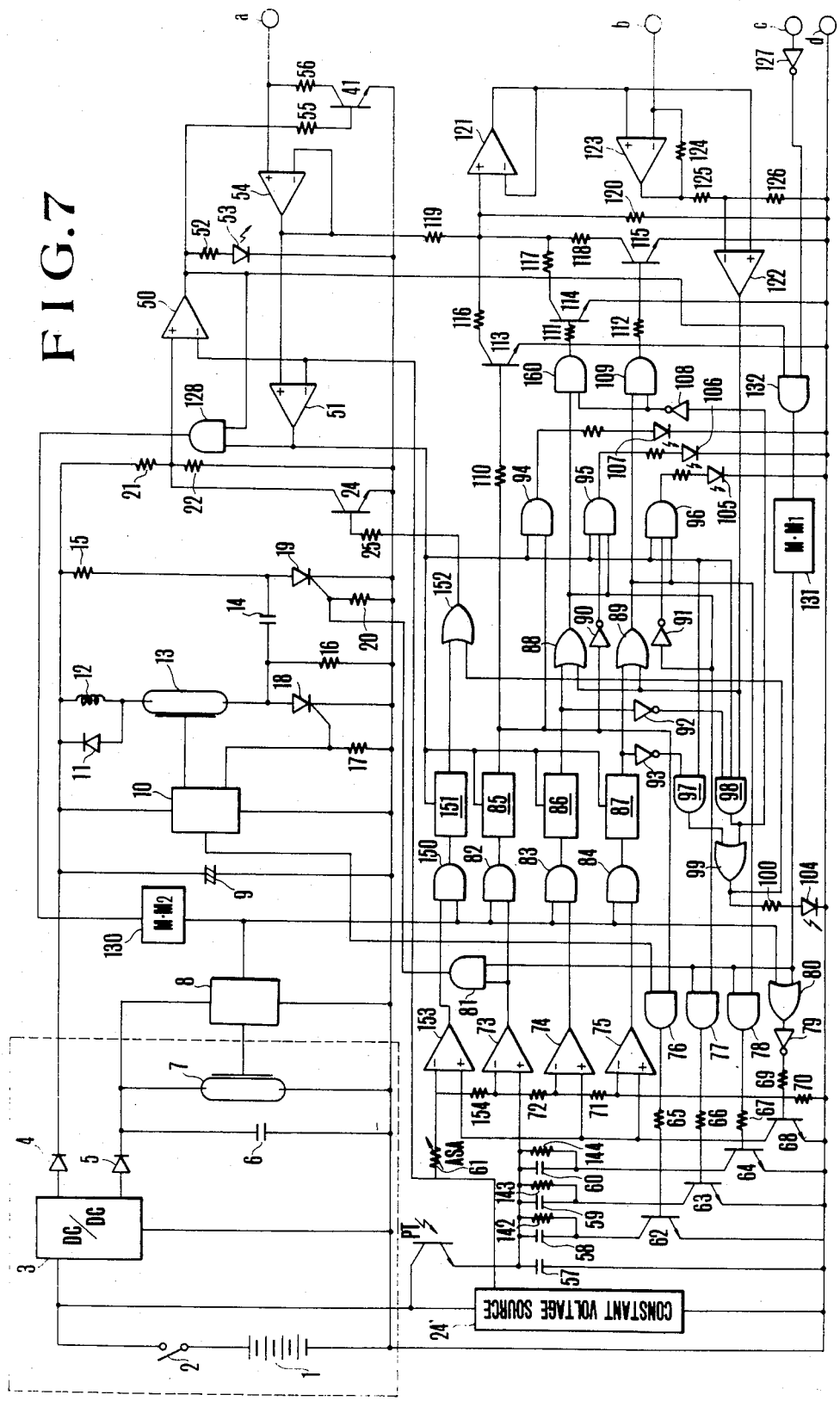
FIG. 7 is a circuit diagram showing a flash device as a further embodiment of the invention.

A flash device arranged as a further embodiment of the invention is as shown in the circuit diagram of FIG. 7. In FIG. 7, the same parts as those shown in other embodiments shown in FIGS. 1 and 5 are indicated with the same reference numerals and symbols. This embodiment differs from the embodiment shown in FIG. 5 in the following points: There are added a comparator 153, an AND gate 150, a latch circuit 151; and an OR gate 152 which are provided in addition to the arrangement of the embodiment shown in FIG. 5. With these parts added, flash photography is inhibited to have photographing carried out in the daylight photography mode not only when the object is located at an excessively long distance but also when the object is located at a distance shorter than the distance d0.

Referring to FIG. 7, the embodiment operates as follows:

Where the full-open aperture value $F_{AVO}$ of the lens in use is smaller (or brighter) than the aperture value $F_2$ and where the object to be photographed is located at a distance within any of the distance ranges d0-d1, d1-d2 and d2-d3 or farther than d3, the diaphragm aperture is controlled according to the aperture values $F_0$, $F_1$ and $F_2$ or in the daylight photography mode as applicable in exactly the same manner as in the case of the embodiment shown in FIG. 5. Thus, flash photographing is carried out when the distance to the object is within the range from d0 to d3 and daylight photographing is carried out when the distance to the object is farther than the distance d3. The operation in these instances, therefore, requires no further description.

However, if the distance to the object is nearer than the distance d0, the pre-flashing action results in a high level output of the capacitor 57 which is higher than the inversion input terminal potential of the comparator 153. In that instance, therefore, the comparator 153 produces an HL output, which is then transmitted through the AND gate 153 and is held at the latch circuit 151. Therefore, an HL signal from the latch circuit 151 is transmitted to the base of the transistor 24 through the OR gate 152. This causes the transistor 24 to turn on. In this instance, therefore, the photographing mode is shifted from the flash photography mode to the daylight photography mode in the same manner as in the case of a longer distance than the distance d3. An exposure is then effected in the daylight photography mode in response to the second stroke of an operation on the release button of the camera.

The embodiment is thus arranged such that, when the object is located at a distance outside of an adequately operatable range for flash photography, the exposure is automatically controlled in the daylight photography mode to ensure adequate exposure control.

Figure 8A:
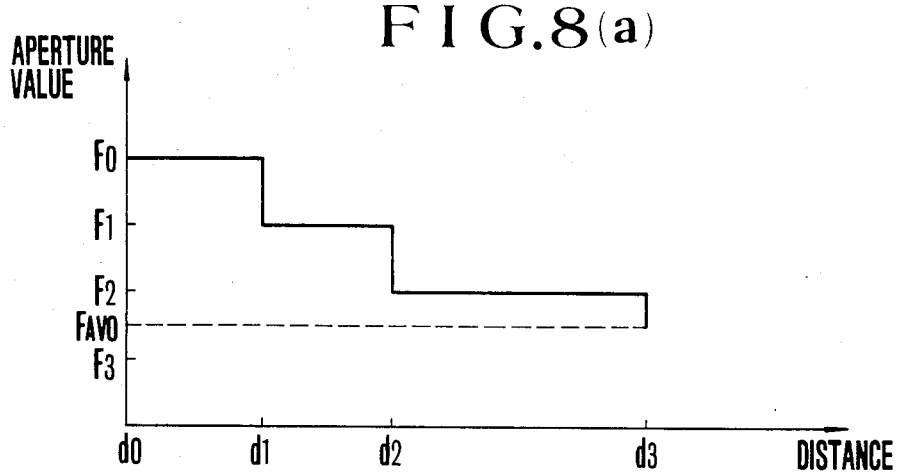
FIGS. 8(a) and (b) are illustrations showing the operation of the embodiment shown in FIG. 7.
Figure 8B:
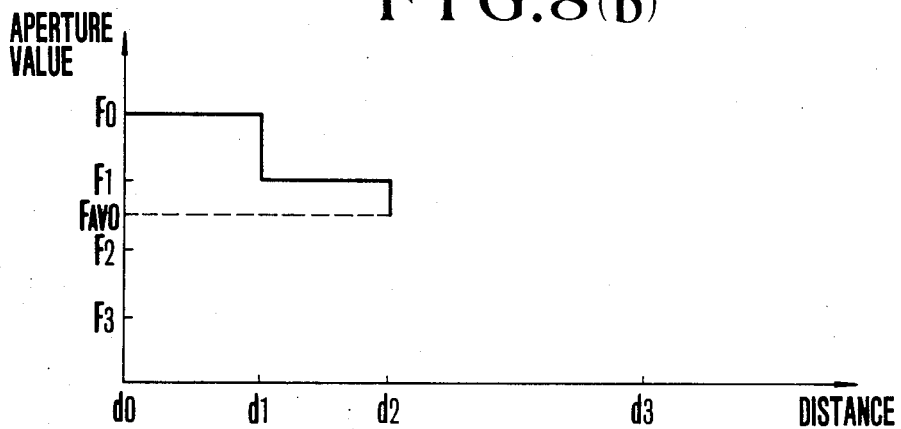

In cases where photographing is to be carried out with a lens of a full-open aperture value $F_{AVO}$ which is larger than the aperture value $F_2$, the embodiment operates in the following manner: In this case, if the object is located at a distance within the distance range d0-d1, d1-d2 or farther than d2, the diaphragm aperture is controlled in accordance with the aperture value $F_0$, $F_1$ or an aperture value for daylight photography as shown in FIG. 8(b) in the same manner as in the case of the embodiment shown in FIG. 5. With the distance to the object within the distance range of d0-d2, a flash photographing operation is performed. A daylight photographing operation is performed if the distance to the object is farther than the distance d2. The operation for these instances requires no further description.

If the distance to the object is nearer than the distance d0 on the other hand, the photographing operation is carried out in the daylihgt photography mode, in the same manner as in the case of smaller full-open F-number than the aperture value $F_2$, because the HL signal is held at the latch circuit 151.

In accordance with the arrangement of the embodiment shown in FIG. 7, the photographing operation is carried out in the daylight photography mode both in the case of the object's distance nearer than d0 and in the case of the distance farther than d3.

Figure 9:
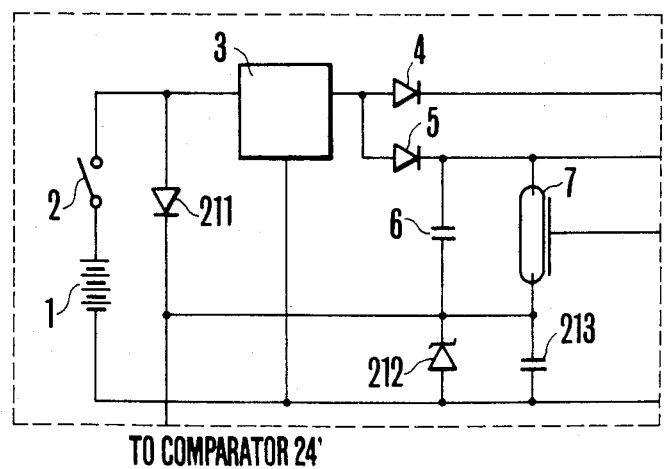
FIG. 9 is a circuit diagram showing a modification example of a power supply circurt portion of the embodiment shown in FIG. 7.

FIG. 9 is a circuit diagram showing, as another embodiment example, the power circuit and the distance measuring flash circuit which are enclosed with a broken line in FIG. 7. In FIG. 9, the same parts as those shown in FIG. 7 are indicated with the same reference numerals. In the case of FIG. 9, however, a diode 211 is connected between the input terminal of the DC-to-DC converter 3 and the constant voltage circuit 24'. A zener diode 212 is connected in series with the auxiliary capacitor 6. Further, a capacitor 213 is series connected to the auxiliary discharge tube 7. The cathodes of the diode 211 and the zener diode 212 and the capacitor 213 are also connected. This embodiment thus differs from the arrangement of FIG. 7. With the power circuit arranged in this manner, even if the output voltage of the battery 1 drops when the pre-flashing action is performed for distance measurement, the power supply can be stably maintained to the load circuits of the flash device (such as the constant voltage source 24' and the integration circuit) to prevent any erroneous actions from occurring due to variation in the battery voltage.

Referring to FIG. 9, when the power source switch 2 is turned on, the capacitor 213 is charged with the current from the battery 1 through the diode 211 until the charge potential of the capacitor 213 becomes about equal to the battery voltage. The auxiliary capacitor 6 is charged with the output of the DC-to-DC converter 3. When the charge of the auxiliary capacitor 6 is discharged for pre-flashing as mentioned in the foregoing under this condition, the output voltage of the battery 1 drops. However, the electric charge of the capacitor 213 is discharged to the constant voltage source and, at the same time, a charging current for the capacitor 6 after pre-flashing is supplied to the constant voltage source by the output of the DC-to-DC converter through the diode 5 and the capacitor 6. Therefore, even when the battery voltage is caused to drop by pre-flashing, a stable output can be supplied to the above stated load circuits of the flash device. Therefore, when the power circuits employed in the embodiments shown in FIGS. 1,5 and 7 are replaced with the power circuit of FIG. 9, the output of the circuit is always stably supplied to the load circuits even if the battery voltage drops, so that erroneous actions due to a drop in the battery voltage can be effectively prevented.

When the electric charge of the capacitor 213 is discharged as mentioned above, the terminal potential of the capacitor 213 also drops. However, since the charging current for the capacitor 213 is supplied by the output of the DC-to-DC converter 3 through the diode 5 and the capacitor 6 as mentioned above, the terminal potential of the capacitor 213 is kept almost unvarying in spite of the discharge to maintain a stable power supply to the load circuits of the flash device.

Figure 10A:
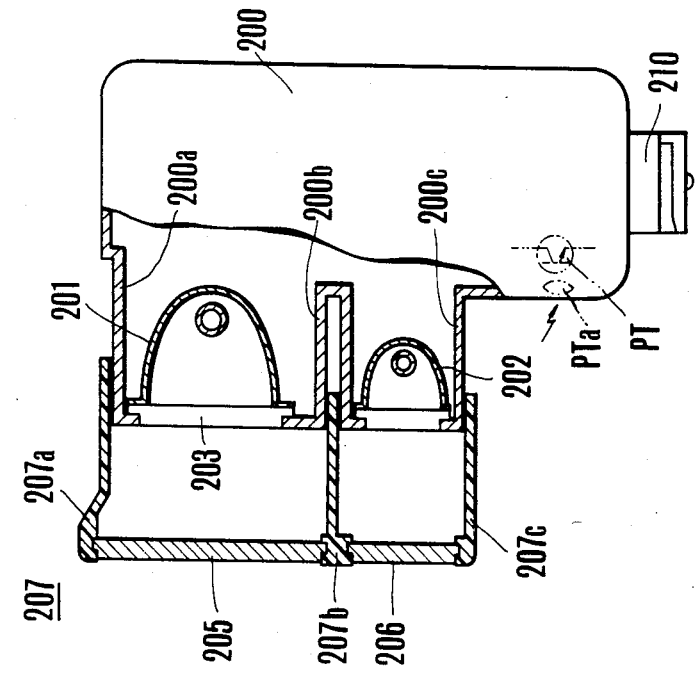
FIGS. 10(a) and (b) are partially sectional views showing the outside appearances and the structural arrangement of the flash devices of FIGS. 1, 5 and 7.
Figure 10B:
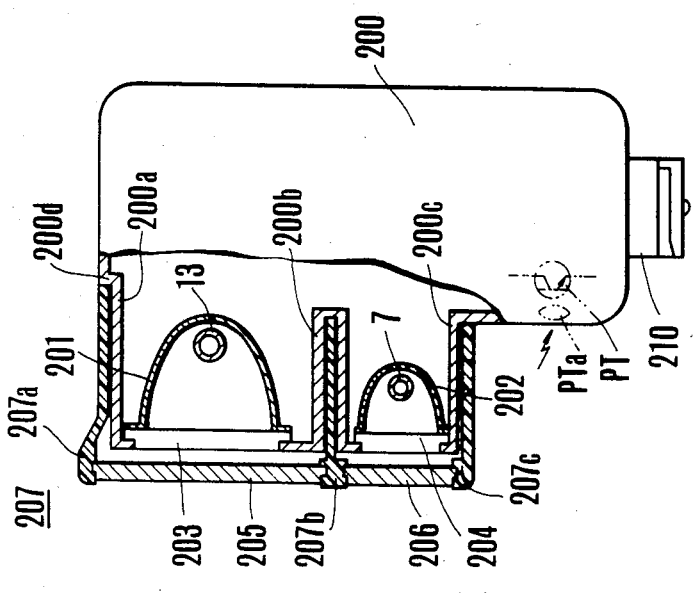

The outside appearances of the flash devices shown in FIGS. 1, 5 and 7 are as shown in FIGS. 10(*a*) and (*b*).

Referring to FIG. 10(*a*), the body 200 of the flash device contains therein the above stated flash photographing main discharge tube 13 which is secured to a reflection shade 201; the above stated distance measuring auxiliary discharge tube 7 which is secured to another reflection shade 202; and the above stated phototransistor which is arranged to measure a reflection light coming from an object through a condenser lens PTa. A protection panel made of an acrylic resin material is disposed in front of a main flashing part which include the main discharge tube 13. This panel is carried by parts 200a and 200b of the casing of the flash device body 200. A filter 204 which is arranged to transmit only infrared rays to prevent disagreeable feeling of the person or persons to be photographed is disposed in front of a pre-flashing part which includes the auxiliary discharge tube 7. The filter 204 is carried by parts 200b and 200c of the casing of the flash device body 200 and is thus arranged to serve as a protection panel. The main flashing part is provided with a Fresnel lens which are carried jointly by parts 207a and 207b of the casing of an adapter 207. The pre-flashing part is provided with a Fresnel lens 206 which is carried jointly by parts 207b and 207c of the casing of the above stated adapter 207. The casing of the adapter 207 includes the parts 207a, 207b and 207c which are formed in one unified body and are arranged to make the projection angles of the main flashing part and the pre-flashing part variable. The part 207a is arranged to be slidable over the part 200a of the casing of the body 200. The part 207b is arranged to be slidable along a groove formed by the part 200b of the casing of the body 200. Meanwhile, the part 207c is arranged to be slidable over the part 200c of the casing of the body 200. The flash device is provided with a mounting leg which is arranged to fittingly engage a hot shoe which is not shown but is disposed on the camera side.

Figure 11:
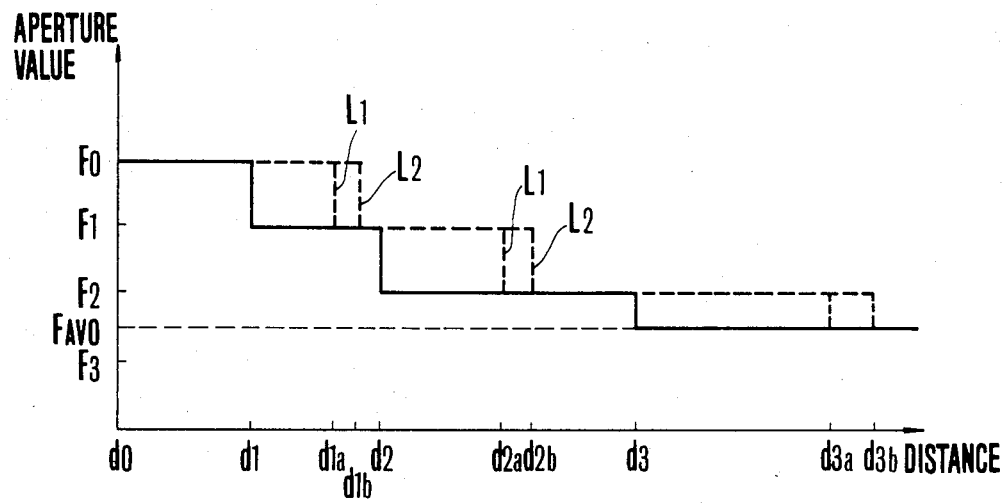
FIG. 11 is an illustration showing the operation of the structural arrangement shown in FIG. 10.

With the flash device arranged in this manner, when the flash device is mounted on the camera and when the end of the adapter 207 comes to abut on a raised portion 200d of the casing part 200a of the body 200, the diaphragm aperture of the photo-taking lens which is not shown is adjusted as has been described with reference to FIGS. 1, 5 and 7 and in such a manner as shown with a full line in FIG. 11. Referring now to FIG. 10(*b*), the angles of projection of the main flashing and pre-flashing parts gradually narrow according as the adapter 207 is moved forward. The guide number of the flash device then increases with the extent of the forward movement of the adapter 207. Accordingly, the relation of the aperture of the photo-taking lens to be adjusted to the adequately operatable distance range varies as indicated by broken lines in FIG. 11. The characteristic of this relation changes as indicated by a line L1 when the adapter 207 is moved forward to a slight extent and further changes as indicated by another line L2 when the adapter 207 is moved further forward. With the adapter 207 arranged to be movable forward in this manner, flash photographing can be carried out at a small aperture for an object located at a relatively long distance.

The above stated Fresnel lenses 203 and 206 are formed by convex lenses. However, they may be formed by concave lenses to permit use of the adapter 207 as a wide adapter. Such a modification of course does not affect the relation between the photo-taking lens and the operatable distance range and the relation still varies with the extent of the forward movement of the adapter. In this case, however, the operatable distance with a small aperture becomes a shorter distance range instead of a longer distance range.

Figure 12:
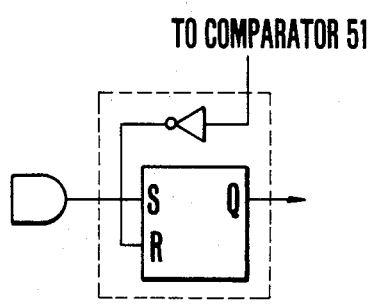
FIG. 12 is a circuit diagram showing the details of arrangement of a latch circuit included in the embodiments shown in FIGS. 1, 5 and 7.

FIG. 12 shows by way of example the details of each of the latch circuits shown in FIGS. 1, 5 and 7. Referring to FIG. 12, the part encompassed with a broken line represents the latch circuit. Such being the arrangement, the latch circuit is released from a reset state in response to an HL output from the comparator 51. When an HL output is produced from the AND gate (82–84, 150 shown in FIGS. 1, 5 and 7) connected to the set terminals, the latch circuit produces an HL output from the output terminal Q thereof. This condition of the latch circuit persists until the output of the comparator becomes LL to supply an HL signal to the reset terminal R of the latch circuit through an inverter.

Figure 13:
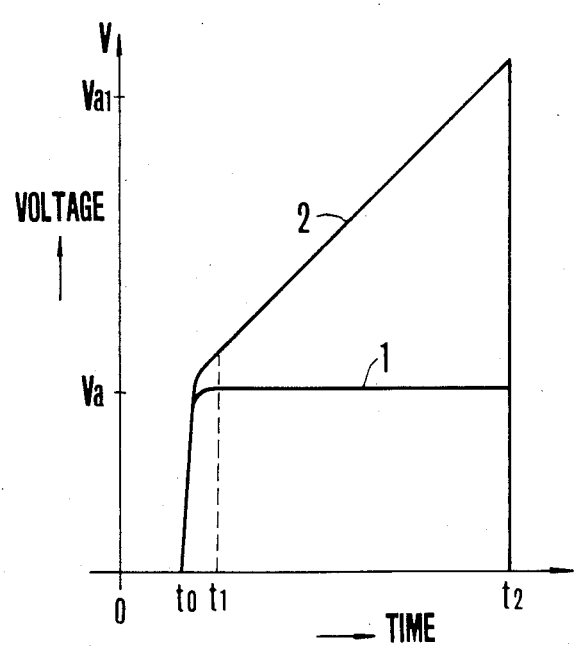
FIG. 13 is an illustration showing the operation of the flash devices shown in FIGS. 1, 5 and 7.

In each of the embodiments described above, the pulse time of the one-shot circuit 130 is set at 10 $\mu$s which corresponds to the pre-flashing time. However, in accordance with the invention, this length of time may be increased to permit determination of an aperture value by taking into consideration a natural light brightness of the object to be photographed. More specifically stated with reference to FIG. 13, the pulse width time of the one-shot circuit 130 is set at t0–t2. Then after the lapse of the pre-flashing time t0–t1, the capacitor 57 shown in FIGS. 1, 5 and 7 comes to show a charge characteristic corresponding to the brightness of the object. Assuming that the object is located at a distance within the medium distance range d1–d2, when the capacitor is charged up to a voltage value Va through the pre-flashing action, the charge level of the capacitor 57 is kept at Va as represented by a line 1 and the aperture value is set at $F_1$ as described in the foregoing if the object is dark. However, if the object is under a high brightness condition at that time, the capacitor 57 is charged in a manner as indicated by a line 2 after the pre-flashing action. Accordingly, in such a case, the charge level of the capacitor 57 at the time of operation of the latch circuit reaches a value Val. Accordingly, in that case, the aperture value is set at $F_0$. With the pulse width time lengthened in this manner, the aperture value can be determined taking a natural light brightness into consideration. This arrangement, therefore, has an advantage for a backlight shot.

In the flash device according to the invention, when the distance to the object to be photographed is detected by pre-flashing or the like to be beyond an adequately operatable distance range or to be too close, either the flashing action is inhibited or the photographing mode is shifted to a daylight photographing mode. Therefore, in accordance with the invention, the inconvenience that arises when an object to be photographed is located outside of an adequately operatable distance range as mentioned in the foregoing can be effectively prevented. The arrangement to adjust the charging level for the main capacitor according to the distance to the object effectively shortens a waiting time for a flash photographing operation on an object located at a short distance. This arrangement gives more shutter chances to the photographer.

What we claim:

1. A flash device, comprising:
   (a) a combination of pre-flashing means and main flashing means disposed in front of a flash device body;
   (b) a light sensitive element arranged to receive a reflection light which results from flashing by said flashing means and comes from an object to be photographed; and
   (c) a panel arranged in front of the flash device body to define the projection light characteristics of flash lights projected from said pre- and main flashing means to the object, said panel being slidable relative to the front of the flash device body and said projection light characteristics of said pre-flashing means and said main flashing means being arranged to be variable with the slided position of said panel simultaneously and in the same manner.

2. A flash device comprising:
   (a) main flashing means for generating flash for exposure;
   (b) pre-flashing means for effecting a flash before an exposure; and
   (c) irradiation angle regulating means for matching the irradiation angle characteristic of the light emitted by said main flashing means onto an object and the irradiation angle characteristic of the light emitted by said pre-flashing means.

3. A flash device according to claim 2, in which said irradiation angle regulating means is arranged in front of said main flashing means and said pre-flashing means.

4. A flashing device according to claim 2, in which the irradiation angle regulating means is divided into a part for said main flashing means and a part for said pre-flashing means, each being arranged in front of the respective flashing means.

5. An adapter for a flash device having main flashing means for effecting a main flash for an exposure and pre-flashing means for effecting a pre-flash prior to the exposure comprising a light transmission member for matching the irradiation angle characteristic of the light emitted by said main flashing means and the irradiation angle characteristic of the light emitted by said pre-flashing means.

6. An adapter according to claim 5, in which the light transmission member is arranged in front of said main flashing means and said pre-flashing means.

7. An adapter according to claim 5, which the light transmission member is divided into a part for said main flashing means and a part for said pre-flashing means, each being arranged in front of the respective flashing means.

8. An adapter for a flash device having main flashing means for effecting a main flash for an exposure and pre-flashing means for effecting a pre-flash prior to the exposure comprising:
   (a) first irradiation angle regulating means for changing the irradiation angle characteristic of the flash from said main flashing means; and
   (b) second irradiation angle regulating means for matching the irradiation angle characteristic changed by said first irradiation angle regulating means and the irradiation angle characteristic of the flash from said pre-flashing means.

* * * * *